(12) United States Patent
Sugawara et al.

(10) Patent No.: US 6,400,448 B1
(45) Date of Patent: Jun. 4, 2002

(54) PHOTO DETECTING DEVICE, DISTANCE MEASURING APPARATUS, AND DISTANCE/IMAGE MEASURING APPARATUS

(75) Inventors: Ryoichi Sugawara, Nagoya; Naoki Sano, Oobu, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/696,969

(22) Filed: Oct. 27, 2000

(30) Foreign Application Priority Data

Nov. 5, 1999 (JP) .......................... 11-315098
Sep. 18, 2000 (JP) ........................ 2000-281909

(51) Int. Cl.$^7$ .................. G01C 3/08; B01B 11/26; B60T 7/16
(52) U.S. Cl. .................... 356/5.01; 356/141.1; 180/169
(58) Field of Search ............... 356/5.01–5.15, 356/141.1; 180/169

(56) References Cited

U.S. PATENT DOCUMENTS

| 4,764,982 A | * | 8/1988 | Pfund |
| 4,862,276 A | * | 8/1989 | Wang et al. |
| 5,485,009 A | * | 1/1996 | Meyzonnetie et al. |
| 5,705,870 A | | 1/1998 | Throngnumchai et al. |
| 5,760,886 A | | 6/1998 | Miyazaki et al. |
| 6,137,566 A | * | 10/2000 | Leonard et al. |

FOREIGN PATENT DOCUMENTS

| JP | 7-98381 | 4/1995 |
| JP | 7-182600 | 7/1995 |
| JP | 8-304540 | 11/1996 |
| JP | 2000-56018 | 2/2000 |

OTHER PUBLICATIONS

Takemoto, "Development of Solid Image Pickup Devices (MOS Type) for Electronic Still Camera", Electronic Still Camera, Jun. 9, 1989 (w/partial English translation).

* cited by examiner

Primary Examiner—Stephen C. Buczinski
(74) Attorney, Agent, or Firm—Law Offices of David G. Posz

(57) ABSTRACT

A photo detecting device includes an output line leading to a processing circuit, and an array of pixels including respective photo detecting zones for changing incident light into corresponding electric signals through photoelectric conversion. Each of the pixels includes a first switch for selectively connecting and disconnecting a related photo detecting zone to and from the output line, and a second switch for selectively connecting and disconnecting the related photo detecting zone to and from a ground line. The second switch disconnects the related photo detecting zone from the ground line when the first switch connects the related photo detecting zone to the output line. The second switch connects the related photo detecting zone to the ground line when the first switch disconnects the related photo detecting zone from the output line.

20 Claims, 19 Drawing Sheets

PHOTO DETECTING DEVICE, DISTANCE MEASURING APPARATUS, AND DISTANCE/IMAGE MEASURING APPARATUS

BACKGROUND OF THE INVENTION

1. Field of the Invention

This invention relates to a photo detecting device. In addition, this invention relates to a distance measuring apparatus. Furthermore, this invention relates to a distance and image measuring apparatus.

2. Description of the Related Art

There is a conventional distance measuring apparatus mounted on a vehicle. The conventional apparatus intermittently emits a laser beam into a predetermined angular range outside the body of the vehicle. The predetermined angular range is scanned by the laser beam. Thus, the predetermined angular range is also referred to as the scanned range. When an object in the scanned range reflects the laser beam, a portion of the laser beam returns to the apparatus as an echo. The apparatus measures the time difference between the timing of the emission of the laser beam and the timing of the reception of the echo. The apparatus calculates the distance to the object on the basis of the measured time difference. The scanned range corresponds to a detection area. Basically, it is desirable to provide a wide scanned range, that is, a wide detection area.

When the scanned range is excessively wide, the following problems arise. The apparatus on the present vehicle receives a laser beam emitted from an apparatus on another vehicle running on the opposite lane. The received laser beam interferes with a distance measurement by the apparatus on the present vehicle. The apparatus on the present vehicle receives an echo related to an apparatus on another vehicle running on an adjacent lane. The received echo interferes with a distance measurement by the apparatus on the present vehicle.

U.S. Pat. No. 5,760,886 corresponding to Japanese published unexamined patent application 7-98381 discloses a scanning-type distance measurement device which is responsive to selected signals to reduce interference due to stray light. An emitted beam of light is aimed to be reflected from an object toward a photodetector among a plurality of photodetectors which are positioned linearly or in two dimensions. The outputs of the photodetectors are selected based on the position of the emitted beam of light to ignore photodetectors which should not contribute to the reflected beam. The approach in U.S. Pat. No. 5,760,886 reduces the effects of stray noise from other light sources. The selection of the photodetectors is synchronized with a scanning light emitter by a position signal and an angular signal so that the noise component in the output signal can be kept to a minimum.

In the device of U.S. Pat. No. 5,760,886, a switch is provided between a timing circuit and an array of photodetectors. The switch selects one from among the photodetectors, and transmits the output signal of the selected photodetector to the timing circuit. A possible problem in the device of U.S. Pat. No. 5,760,886 is as follows. The output signals of the non-selected photodetectors leak to the timing circuit through the switch. Therefore, in the case where a non-selected photodetector receives stray light, a noise signal leaks therefrom to the timing circuit. In this case, the timing circuit responds to the noise signal.

SUMMARY OF THE INVENTION

It is a first object of this invention to provide an improved photo detecting device.

It is a second object of this invention to provide an improved distance measuring apparatus.

It is a third object of this invention to provide an improved distance and image measuring apparatus.

A first aspect of this invention provides a photo detecting device comprising a processing circuit; an output line leading to the processing circuit; a ground line; an array of pixels including respective photo detecting zones for changing incident light into corresponding electric signals through photoelectric conversion, wherein each of the pixels includes a first switch for selectively connecting and disconnecting a related photo detecting zone to and from the output line, and a second switch for selectively connecting and disconnecting the related photo detecting zone to and from the ground line; means for causing the second switch to disconnect the related photo detecting zone from the ground line when the first switch connects the related photo detecting zone to the output line; and means for causing the second switch to connect the related photo detecting zone to the ground line when the first switch disconnects the related photo detecting zone from the output line.

A second aspect of this invention is based on the first aspect thereof, and provides a photo detecting device wherein the photo detecting zone of each of the pixels comprises a pin photodiode, and the first and second switches are formed in well layers separate from the photo detecting zone.

A third aspect of this invention is based on the first aspect thereof, and provides a photo detecting device further comprising a matrix arrangement of pixels provided in the array of pixels, common lines provided in the output line, wherein pixels in one of one-direction pixel groups in the matrix arrangement are connected to one of the common lines, a third switch for selectively connecting and disconnecting one of the common lines to and from the processing circuit, a fourth switch for selectively connecting and disconnecting one of the common lines to the ground line, means for causing the fourth switch to disconnect the related common line from the ground line when the third switch connects the related common line to the processing circuit, and means for causing the fourth switch to connect the related common line to the ground line when the third switch disconnects the related common line from the processing circuit.

A fourth aspect of this invention is based on the third aspect thereof, and provides a photo detecting device further comprising first control lines each for controlling the first switches in one of row-direction pixel groups in the matrix arrangement, second control lines each for controlling the second switches in one of the row-direction pixel groups in the matrix arrangement, a third control line for controlling the third switch, and a fourth control line for controlling the fourth switch.

A fifth aspect of this invention is based on the first aspect thereof, and provides a photo detecting device further comprising a capacitor provided in each of the pixels for storing electric charges generated by the related photo detecting zone in response to the incident light, an image-signal output line leading to the processing circuit, a fifth switch provided in each of the pixels for selectively connecting and disconnecting the photo detecting zone to and from the capacitor, a sixth switch for selectively connecting and disconnecting the capacitor to and from the image-signal output line, the second switch being for selectively connecting and disconnecting the capacitor to and from the ground line, and means for causing the second switch to connect the capacitor to the ground line during a predetermined time interval after causing the sixth switch to connect the capacitor to the image-signal output line.

A sixth aspect of this invention is based on the fifth aspect thereof, and provides a photo detecting device further comprising a matrix arrangement of pixels provided in the array of pixels, common image-signal lines provided in the image-signal output line, wherein pixels in one of one-direction pixel groups in the matrix arrangement are connected to one of the common image-signal lines, and a seventh switch for selectively connecting and disconnecting one of the common image-signal lines to and from the processing circuit.

A seventh aspect of this invention provides a photo detecting device comprising a processing circuit; a matrix arrangement of pixels including respective photo detecting zones for changing incident light into corresponding electric signals through photoelectric conversion; common output lines leading to the processing circuit and each provided for pixels in one of one-direction pixel groups in the matrix arrangement; a ground line; a first switch provided in each of the pixels for selectively connecting and disconnecting a related photo detecting zone to and from one of the common output lines; a third switch for selectively connecting and disconnecting one of the common output lines to and from the processing circuit; a fourth switch for selectively connecting and disconnecting one of the common output lines to and from the ground line; means for causing the fourth switch to disconnect the related common output line from the ground line when the first switch connects the related photo detecting zone to the common output line and the third switch connects the related common output line to the processing circuit; and means for causing the fourth switch to connect the related common output line to the ground line when the first switch disconnects the related photo detecting zone from the common output line and the third switch disconnects the related common output line from the processing circuit.

An eighth aspect of this invention provides a photo detecting device comprising a processing circuit; a matrix arrangement of pixels including respective photo detecting zones for changing incident light into corresponding electric signals through photoelectric conversion; a last-stage output line leading to the processing circuit; common output lines connected to the last-stage output line and each provided for pixels in one of one-direction pixel groups in the matrix arrangement; a ground line; a first switch provided in each of the pixels for selectively connecting and disconnecting a related photo detecting zone to and from one of the common output lines; a third switch for selectively connecting and disconnecting one of the common output lines to and from the last-stage output line; a fourth switch for selectively connecting and disconnecting the last-stage output line to and from the ground line; means for causing the fourth switch to disconnect the last-stage output line from the ground line when the first switch connects the related photo detecting zone to the common output line and the third switch connects the related common output line to the last-stage output line; and means for causing the fourth switch to connect the last-stage output line to the ground line when the first switch disconnects the related photo detecting zone from the common output line and the third switch disconnects the related common output line from the last-stage output line.

A ninth aspect of this invention is based on the seventh aspect thereof, and provides a photo detecting device further comprising means for causing the first switch to connect the related photo detecting zone to the common output line and causing the third switch to connect the related common output line to the processing circuit when the fourth switch connects the related common output line to the ground line, and then causing the fourth switch to disconnect the related common output line from the ground line.

A tenth aspect of this invention is based on the seventh aspect thereof, and provides a photo detecting device further comprising a capacitor provided in each of the pixels for storing electric charges generated by the related photo detecting zone in response to the incident light, an image-signal output line leading to the processing circuit, a fifth switch provided in each of the pixels for selectively connecting and disconnecting the photo detecting zone to and from the capacitor, a sixth switch for selectively connecting and disconnecting the capacitor to and from the image-signal output line, a seventh switch for selectively connecting and disconnecting the image-signal output line to and from the processing circuit, and an eighth switch for selectively connecting and disconnecting the image-signal output line to and from the ground line.

An eleventh aspect of this invention is based on the fifth aspect thereof, and provides a photo detecting device further comprising means for connecting the photo detecting zone and the capacitor in series in each of the pixels, and an amplifier circuit provided between the sixth switch and the image-signal output line.

A twelfth aspect of this invention is based on the fifth aspect thereof, and provides a photo detecting device further comprising means for connecting the photo detecting zone and the capacitor in parallel in each of the pixels, means for precharging the capacitor, means for discharging the capacitor in response to the incident light applied to the photo detecting zone, and means for causing the first switch to connect the photo detecting zone to the output line to output the electric signal to the output line, and then causing the sixth switch to connect the capacitor to the image-signal output line to output the electric charges to the image-signal output line.

A thirteenth aspect of this invention is based on the fifth aspect thereof, and provides a photo detecting device further comprising fifth control lines each for controlling the fifth switches in one of row-direction pixel groups in the matrix arrangement, and sixth control lines each for controlling the sixth switches in one of the row-direction pixel groups in the matrix arrangement.

A fourteenth aspect of this invention provides a distance measuring apparatus comprising light applying means for applying laser light; a photo detecting device for detecting reflected light caused by reflection of the laser light applied by the light applying means at an object, the photo detecting device including a plurality of pixels; changing and selecting means for changing and selecting a pixel among the pixels in the photo detecting device as an active pixel; time difference measuring means for measuring a time difference between a moment of application of the laser light by the light applying means and a moment of detection of the reflected light by the photo detecting device; and distance calculating means for calculating a physical quantity representative of a distance to the object on the basis of the time difference measured by the time difference measuring means; wherein the photo detecting device comprises a photo detecting device of the first aspect of this invention.

A fifteenth aspect of this invention is based on the fourteenth aspect thereof, and provides a distance measuring apparatus wherein the changing and selecting means comprises means for changing and selecting a pixel among the pixels in the photo detecting device as an active pixel in response to a direction of application of the laser light.

A sixteenth aspect of this invention is based on the fourteenth aspect thereof, and provides a distance measuring apparatus which is mounted on a vehicle, wherein a direction of travel of the laser light corresponds to one of a vehicle width-wise direction and a vehicle height direction with respect to the vehicle.

A seventeenth aspect of this invention provides a distance and image measuring apparatus comprising light applying means for applying laser light; a photo detecting device for detecting reflected light caused by reflection of the laser light applied by the light applying means at an object, and for generating an image signal in response to the detected reflected light; time difference measuring means for measuring a time difference between a moment of application of the laser light by the light applying means and a moment of detection of the reflected light by the photo detecting device; distance calculating means for calculating a physical quantity representative of a distance to the object on the basis of the time difference measured by the time difference measuring means; and image measuring means for measuring an image on the basis of the image signal generated by the photo detecting device; wherein the photo detecting device comprises a photo detecting device of the fifth aspect of this invention.

An eighteenth aspect of this invention is based on the seventeenth aspect thereof, and provides a distance and image measuring apparatus further comprising means for changing an intensity of the laser light applied by the light applying means in accordance with the image measured by the image measuring means.

A nineteenth aspect of this invention provides a photo detecting device comprising a photodiode; a signal output line; a ground line; a first switch provided between the photodiode and the signal output line for selectively connecting and disconnecting the photodiode to and from the signal output line; and a second switch provided between the ground line and a junction between the photodiode and the first switch for selectively connecting and disconnecting the ground line to and from the junction between the photodiode and the first switch.

A twentieth aspect of this invention is based on the nineteenth aspect thereof, and provides a photo detecting device further comprising a last-stage signal transmission line; a third switch provided between the signal output line and the last-stage signal transmission line for selectively connecting and disconnecting the signal output line to and from the last-stage signal transmission line; and a fourth switch provided between the ground line and a junction between the signal output line and the third switch for selectively connecting and disconnecting the ground line to and from the junction between the signal output line and the third switch.

DESCRIPTION OF THE PREFERRED EMBODIMENTS

First Embodiment

Figure 1:
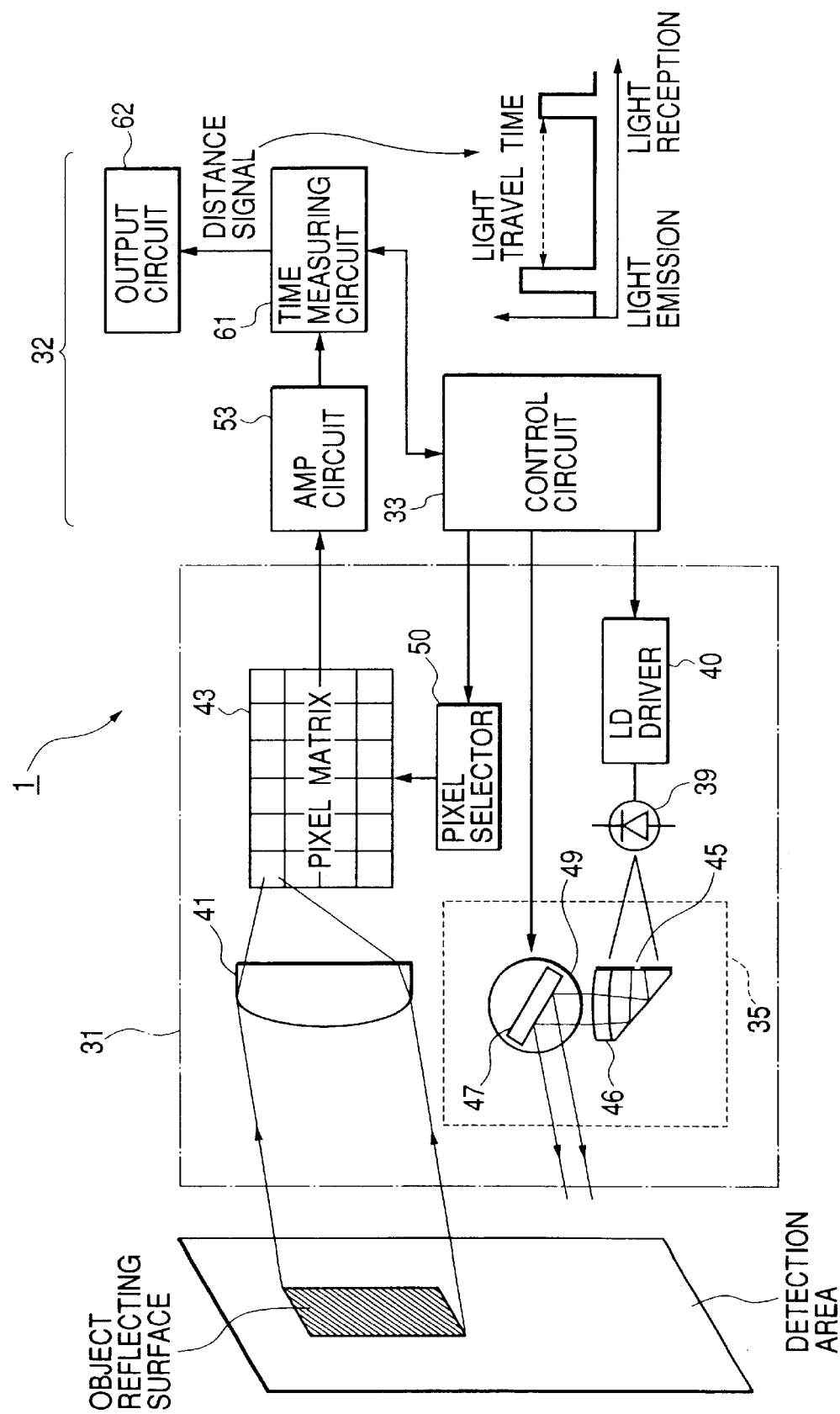
FIG. 1 is a diagram of a distance measuring apparatus according to a first embodiment of this invention.

FIG. 1 shows a distance measuring apparatus 1 according to a first embodiment of this invention. The distance measuring apparatus 1 is mounted on a vehicle. The distance measuring apparatus 1 is designed to measure the distance between the present vehicle and an object. Also, the distance measuring apparatus 1 functions to detect an object such as a preceding vehicle or an obstacle.

The distance measuring apparatus 1 includes a transmitting/receiving section 31 and a processing section 32 as main sections. As shown in FIG. 1, the transmitting/receiving section 31 includes a scanning mechanism 35, a semiconductor laser diode 39, an LD (laser diode) driver 40, a light receiving lens 41, and a photodetector array (a photodiode array or a photo detecting element array) 43. The laser diode 39 emits a train of pulses of a laser beam toward the scanning mechanism 35. The scanning mechanism 35 directs the laser pulse beam toward a detection area. Thus, the scanning mechanism 35 emits a forward laser pulse beam toward the detection area. The forward laser pulse beam scans the detection area. In general, the detection area extends frontward of the vehicle. An object in the detection area reflects the forward laser pulse beam, causing an echo laser pulse beam (a return laser pulse beam). The echo laser pulse beam enters the light receiving lens 41. The echo laser pulse beam is focused on the photodetector array 43 by the light receiving lens 41. The photodetector array 43 outputs a voltage which varies in accordance with the intensity of the received echo laser pulse beam.

The processing section 32 includes a control circuit 33, an amplifier circuit 53, a time measuring circuit 61, and an output circuit 62. The control circuit 33 is connected to the time measuring circuit 61. The amplifier circuit 53 is connected to the time measuring circuit 61. The time measuring circuit 61 is connected to the output circuit 62.

The control circuit 33 includes a microcomputer, a CPU, a signal processor, or a similar device. The control circuit 33 operates in accordance with a program stored in a memory. The program is designed to enable the control circuit 33 to implement operation steps indicated later.

The laser diode 39 is connected via the LD driver 40 to the control circuit 33. A drive signal serving as a trigger signal is fed from the control circuit 33 to the laser diode 39 via the LD driver 40. The laser diode 39 emits a train of pulses of a laser beam in response to the drive signal. The scanning mechanism 35 includes a diaphragm 45, a projector lens 46, a mirror 47, and a scanner 49. The diaphragm 45 receives the laser pulse beam from the laser diode 39. The diaphragm 45 shapes the received laser pulse beam into a laser pulse beam having approximately a rectangular cross-section. The projector lens 46 following the diaphragm 45 further narrows the cross-section of the laser pulse beam. The projector lens 46 applies the resultant laser pulse beam to the mirror 47 which is swung by the scanner 49. The laser pulse beam is reflected and deflected by the mirror 47, being applied to the detection area as a forward laser pulse beam. The direction of the travel of the forward laser pulse beam changes in accordance with the swing of the mirror 47 so that the forward laser pulse beam scans the detection area. The range in which the direction of the travel of the forward laser pulse beam changes corresponds to a predetermined angular range in a horizontal plane along the width-wise direction of the vehicle.

Figure 5:
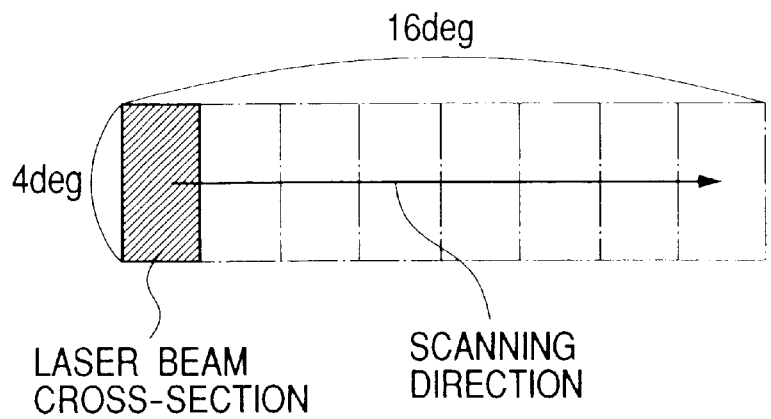
FIG. 5 is a diagram of a laser beam cross-section and a matrix pixel array.

The detection area (the predetermined angular range) corresponds to a scanned area provided by the scanning mechanism 35. The angular dimensions of the scanned area are 4 degrees in the vertical direction (the vehicle height direction), and 16 degrees in the lateral direction (the vehicle width-wise direction). The scanner 49 swings the mirror 47 to provide the lateral 16-degree angular change in the direction of the travel of the forward laser pulse beam. The forward laser pulse beam remains fixed in the vertical direction (the vehicle height direction). As shown in FIG. 5, the rectangular cross-section of the forward laser pulse beam has longer sides in the vertical direction (the vehicle height direction) so that the forward laser pulse beam covers the vertical 4-degree dimension of the scanned area.

The shape of the cross-section of the forward laser pulse beam may be designed to correspond to a 1-degree angle in the vertical direction (the vehicle height direction). In this case, the forward laser pulse beam is moved along the vertical direction (the vehicle height direction) to cover the vertical 4-degree dimension of the scanned area.

The photodetector array 43 has a two-dimensional matrix array of photo detecting pixels each including a photodiode (PD). The size of the matrix pixel array is designed to correspond to the 4-degree by 16-degree size of the scanned area. The dimension of the matrix pixel array along the vertical direction (the vehicle height direction) corresponds to a predetermined number of photo detecting pixels which is equivalent to the 4-degree angle. The dimension of the matrix pixel array along the lateral direction (the vehicle width-wise direction) corresponds to a predetermined number of photo detecting pixels which is equivalent to the 16-degree angle.

Figure 2:
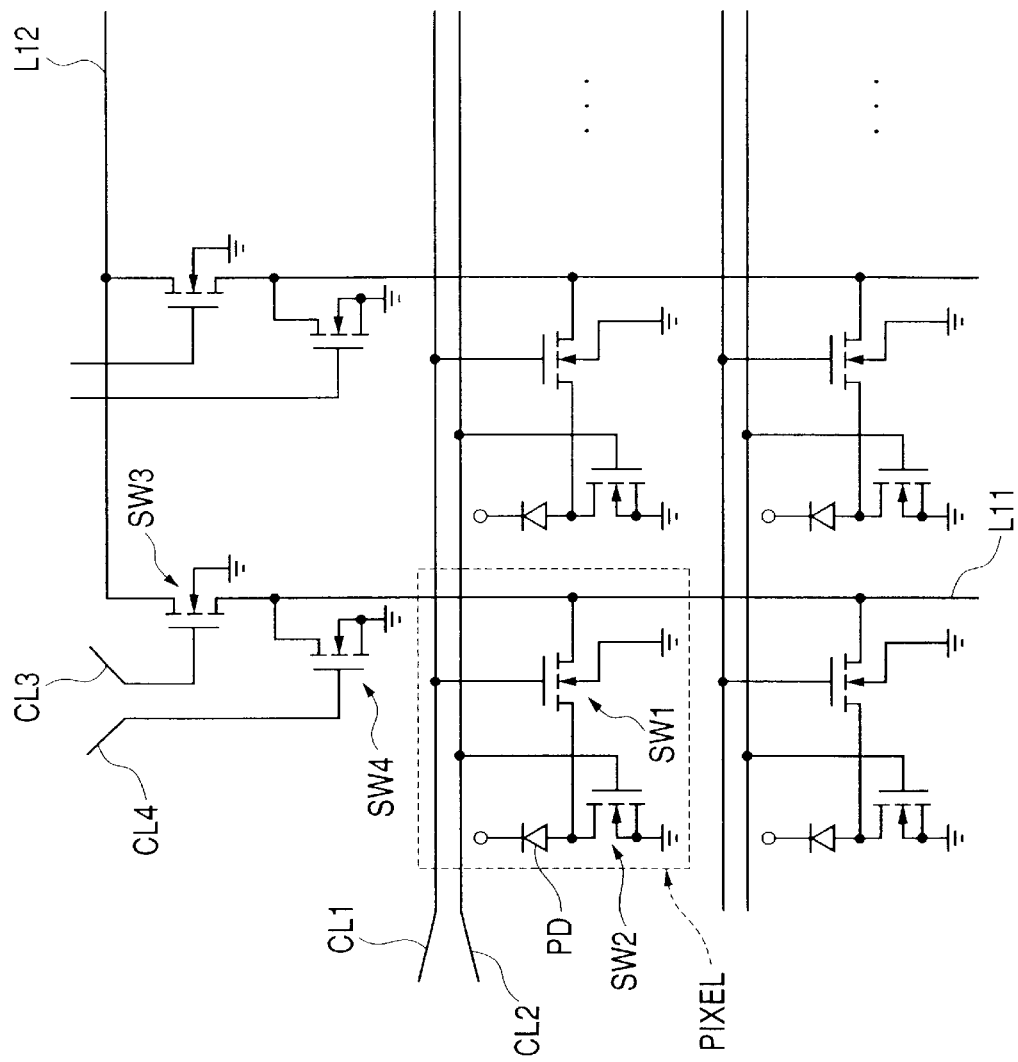
FIG. 2 is a schematic diagram of a portion of a matrix pixel array which forms a portion of a photodetector array in FIG. 1.

FIG. 2 shows a portion of the matrix pixel array which forms a portion of the photodetector array 43. In FIG. 2, the region surrounded by the broken lines shows one photo detecting pixel. Each photo detecting pixel contains a photodiode PD, a switch SW1, and a switch SW2. The photodiode PD forms a photo detecting zone (a photo detecting region). As shown in FIG. 2, the cathode of the photodiode PD is connected to a dc power feed line. The switch SW1 is connected between the anode of the photodiode PD and a vertical-direction output line L11. The switch SW1 is connected to a control line CL1. The switch SW2 is connected between the anode of the photodiode PD and a ground line. The switch SW2 is connected to a control line CL2.

Figure 3:
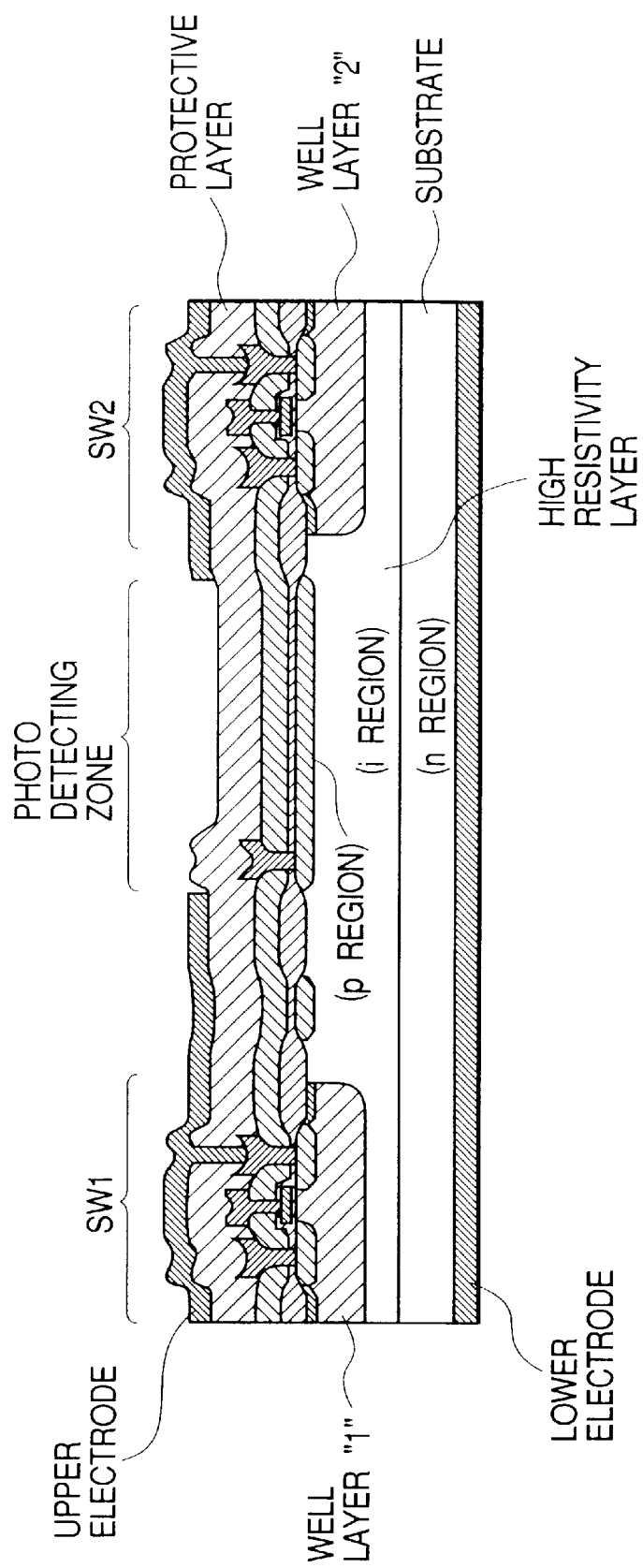
FIG. 3 is a sectional view of one photo detecting pixel in the photodetector array in FIG. 2.

The sectional structure of a photo detecting pixel will be briefly described with reference to FIG. 3. Pin photodiodes are used to attain high-speed performances of a distance measurement. As shown in FIG. 3, the photo detecting zone in the pixel has a sectional structure in which a high resistivity layer forming an intrinsic semiconductor region (an i region or an i layer) is sandwiched between a p-type region (a p region) and an n-type region (an n region).

The structure in FIG. 3 is made as follows. An n-type substrate is prepared. An i region being a high resistivity region is formed on the n-type substrate by epitaxy. P-type impurities are diffused into a surface portion of the i region to form a p region. As a result, a pin photodiode is made.

A p-type substrate may be used instead of the n-type substrate. In this case, the related structure is made as follows. An i region being a high resistivity region is formed on the p-type substrate by epitaxy. N-type impurities are diffused into a surface portion of the i region to form an n region. As a result, a pin photodiode is made.

In this way, the pin structure is made in which the i region is sandwiched between the p layer and the n layer. In the pin structure, carries generated in response to incoming light are accelerated by an electric field in the i region before reaching an output electrode. Thus, the incoming light is converted into an electric signal at a high speed (a high rate).

There is a given relation among the impurity concentration in the i region (the i layer), the preferable thickness thereof, and the preferable voltage applied thereto. The pin photodiode is designed so that carries generated in the i region can be drawn out at a high speed. The pin photodiode has a depletion layer from which free charges are absent, and in which an electric field exists. In the pin diode, the ratio between the intensity of the incoming light and the carrier current taken out via an external electrode, that is, the photo detection sensitivity, is maximized when the thickness of the depletion layer is equal to or greater than the light permeable depth in the substrate along the thickness direction thereof.

For example, in order to attain a photo detection sensitivity in a high frequency band which is equal to 50% or more of that available in a DC-to-low frequency band, it is necessary that the i layer absorbs 50% or more of the incoming light. When the impurity concentration in the i layer is equal to or lower than $10^{14}$, the necessary thickness of the i layer is equal to at least 10 microns and the necessary voltage applied thereto is equal to at least 5 V. Accordingly, in order to provide both a high-speed performance and a high sensitivity when the applied voltage is equal to about several volts, a preferable impurity concentration in the i layer is equal to $10^{14}$ or less and a preferable thickness thereof is equal to 10 microns or more.

In the structure of FIG. 3, the impurity concentration in the i layer is equal to $10^{13}$ and the thickness thereof is equal to 30 micros, and the applied voltage is equal to 5 V. The structure of FIG. 3 has a sensitivity equal to at least 90% of a DC sensitivity with respect to incoming light pulsed at a frequency of 10 MHz.

As shown in FIG. 3, the switch SW1 is formed in a well layer "1" separate from the related photo detecting zone. The switch SW2 is formed in a well layer "2" separate from the related photo detecting zone.

Structures of the matrix pixel array and the switches SW1 and SW2 will be further described with reference to FIG. 2. In the matrix pixel array, photo detecting pixels are arranged along vertical and horizontal directions (column and row directions). Photo detecting pixels in each vertical-direction pixel group (each column-direction pixel group) are connected to a common vertical-direction output line L11.

In FIG. 2, the photodiode PD in the pixel is connected to the common vertical-direction output line L11 via the switch SW1. When the switch SW1 is in its on state (SW1=ON), a photo detection electric signal generated by the photodiode PD and resulting from photoelectric conversion of the incoming light is transmitted through the switch SW1 and is outputted via the vertical-direction output line L11. In FIG. 2, the photodiode PD is connected to the ground line via the switch SW2. When the switch SW2 is in its on state, the photo detection electric signal generated by the photodiode PD is shunted via the switch SW2 to the ground line. In FIG. 2, the switch SW1 is connected to the control line CL1, and the switch SW2 is connected to the control line CL2. The switches SW1 and SW2 can be controlled via the control lines CL1 and CL2 respectively.

In the matrix pixel array, photo detecting pixels in each horizontal-direction pixel group (each row-direction pixel group) are connected to a common control line CL1 and a common control line CL2. The switches SW1 in the pixels in each horizontal-direction group are simultaneously changed to their on states when a suitable voltage signal is applied to the common control line CL1. Similarly, the switches SW2 in the pixels in each horizontal-direction group are simultaneously changed to their on states when a suitable voltage signal is applied to the common control line CL2.

The vertical-direction output lines L11 are connected to a single last-stage output line L12 which leads to the amplifier circuit 53 in the processing section 32 (see FIG. 1). The vertical-direction output lines L11 are provided for the vertical-direction pixel groups respectively. A switch SW3 and a switch SW4 (see FIG. 2) are provided at the connection of each vertical-direction output line L11 to the last-stage output line L12. The switch SW3 is provided between the related vertical-direction output line L11 and the last-stage output line L12. The switch SW3 selectively connects and disconnects the related vertical-direction output line L11 to and from the last-stage output line L12. The switch SW4 is provided between the related vertical-direction output line L11 and the ground line. The switch SW4 selectively connects and disconnects the related vertical-direction output line L11 to and from the ground line. The switch SW3 is connected to a control line CL3. The switch SW4 is connected to a control line CL4. The switches SW3 and SW4 can be controlled via the control lines CL3 and CL4 respectively.

The control lines CL1, CL2, CL3, and CL4 are connected to a pixel selector 50 (see FIG. 1) provided in the transmitting/receiving section 31. The device 50 selects at least one from among the pixels in the photodetector array 43 by applying suitable control voltages to the control lines CL1, CL2, CL3, and CL4. Each switch SW1 is in its on state when the voltage at the related control line CL1 is high, and is in its off state when the voltage is low. Each switch SW2 is in its on state when the voltage at the related control line CL2 is high, and is in its off state when the voltage is low. Each switch SW3 is in its on state when the voltage at the related control line CL3 is high, and is in its off state when the voltage is low. Each switch SW4 is in its on state when the voltage at the related control line CIA is high, and is in its off state when the voltage is low.

During a first selecting process in which the pixel selector 50 applies a high voltage to only one of the control lines CL1 while applying a low voltage to the other control lines CL1 and all the control lines CL2, only the switches SW1 connected to the high-voltage control line CL1 are in their on states and the other switches SW1 and all the switches SW2 are in their off states. Thus, in this case, one is selected from among the horizontal-direction pixel groups (the row-direction pixel groups) in accordance with the high-voltage control line CL1. During a second selecting process in which the pixel selector 50 applies a high voltage to only one of the control lines CL3 while applying a low voltage to the other control lines CL3 and all the control lines CL4, only the switches SW3 connected to the high-voltage control line CL3 are in their on states and the other switches SW3 and all the switches SW4 are in their off states. Thus, in this case, one is selected from among the vertical-direction pixel groups (the column-direction pixel groups) in accordance with the high-voltage control line CL3. The combination of the first selecting process and the second selecting process finally selects one from among the pixels which is located at the intersection between the selected horizontal--direction pixel group and the selected vertical-direction pixel group. It should be noted that two or more pixels can be simultaneously selected. The photo detection electric signal generated by the photodiode PD in the selected pixel is outputted from the photodetector array 43 to the amplifier circuit 53 in the processing section 32.

Figure 4:
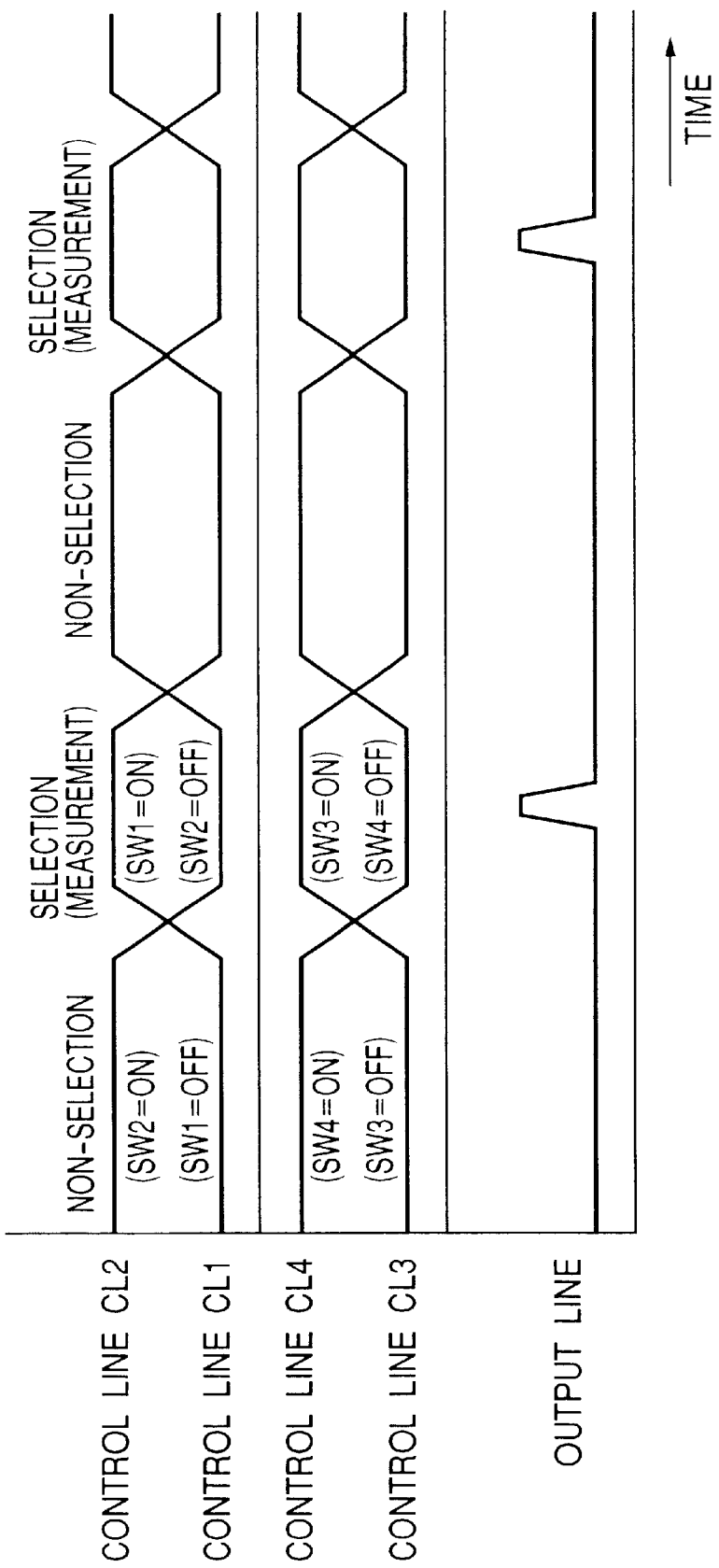
FIG. 4 is a time-domain diagram of signals which appear in various lines in FIG. 2.

The outputting of a photo detection electric signal from the photodetector array 43 to the processing section 32 will be described with reference to FIG. 4. Regarding each non-selected pixel, the switch SW1 is set in its off state by the application of a low voltage to the related control line CL1 so that the photodiode PD is disconnected from the vertical-direction output line L11. At the same time, the switch SW2 is set in its on state by the application of a high voltage to the related control line CL2 so that the photodiode PD is connected to the ground line. In addition, the switch SW3 is set in its off state by the application of a low voltage to the related control line CL3 so that the vertical-direction output line L11 is disconnected from the last-stage output line L12. At the same time, the switch SW4 is set in its on state by the application of a high voltage to the related control line CL4 so that the vertical-direction output line L11 is connected to the ground line.

Regarding a selected pixel, the switch SW1 is set in its on state by the application of a high voltage to the related control line CL1 so that the photodiode PD is connected to the vertical-direction output line L11. At the same time, the switch SW2 is set in its off state by the application of a low voltage to the related control line CL2 so that the photodiode PD is disconnected from the ground line. In addition, the switch SW3 is set in its on state by the application of a high voltage to the related control line CL3 so that the vertical-direction output line L11 is connected to the last-stage output line L12. At the same time, the switch SW4 is set in its off state by the application of a low voltage to the related control line CL4 so that the vertical-direction output line L11 is disconnected from the ground line. The photo detection electric signal generated by the photodiode PD in the selected pixel is transmitted to the vertical-direction output line L11 through the switch SW1. Then, the photo detection electric signal is transmitted from the vertical-direction output line L11 to the last-stage output line L12 through the switch SW3 before being outputted to the amplifier circuit 53 in the processing section 32.

With reference back to FIG. 1, the photo detection electric signal outputted from the photodetector array 43 passes through the amplifier circuit 53 before reaching the time measuring circuit 61. The photo detection electric signal may be amplified to a given level by an STC (sensitivity time control) circuit before being inputted into the amplifier circuit 53. The intensity of the received echo laser pulse beam is inversely proportional to the fourth power of the distance to the object. When the object has a high reflectivity and is located near the vehicle, the intensity of the received echo laser pulse beam is excessively high. The STC circuit is effective in compensating for such a high intensity of the received echo laser pulse beam.

As previously mentioned, the control circuit 33 outputs the drive signal to the LD driver 40. The control circuit 33 feeds the drive signal to the time measuring circuit 61 also. The time measuring circuit 61 uses each pulse in the drive signal as a start pulse PA. The time measuring circuit 61 uses each pulse in the photo detection electric signal as a stop pulse PB. The time measuring circuit 61 detects the phase difference (that is, the time difference) between a start pulse PA and a related stop pulses PB. The time measuring circuit 61 encodes a signal of the detected phase difference into a binary digital signal (data). The time measuring circuit 61 outputs the binary digital signal (the data) to the control circuit 33. The time measuring circuit 61 is able to calculate the numeric value of a short time difference. Even in the case where a plurality of stop pulses PB occur in response to one start pulse PA, the time measuring circuit 61 detects the time differences between the start pulse PA and the strop pulses PB. This means that the time measuring circuit 61 can implement multi-lap. During the multi-lap, the binary digital signal generated by the time measuring circuit 61 contains multi-lap data. The data (the binary digital signal) outputted from the time measuring circuit 61 represents the time difference which corresponds to the distance between the vehicle and the object. Accordingly, the data outputted from the time measuring circuit 61 are referred to as the distance data.

The control circuit 33 outputs a control signal to the scanner 49 which determines the angular position of the mirror 47. The scanner 49 swings the mirror 47 in response to the control signal. The control circuit 33 derives information of the angular position of the mirror 47 from the control signal. The control circuit 33 receives the distance data from the time measuring circuit 61. The control circuit 33 calculates the distance and direction to the object on the basis of the distance data and the information of the angular position of the mirror 47. The control circuit 33 receives a vehicle speed signal from a vehicle speed sensor (not shown).

The distance measuring apparatus 1 operates as follows. The control circuit 33 outputs a pulse of the drive signal to the LD driver 40 as a trigger for light emission from the laser diode 39. As a result, the laser diode 39 emits a pulse of the laser beam. The emitted laser pulse is directed and applied to the detection area by the diaphragm 45, the projector lens 46, and the mirror 47 as a forward laser pulse. When the forward laser pulse meets an object, the forward laser pulse is reflected thereby and changes to an echo laser pulse (or echo laser pulses). The echo laser pulse passes through the light receiving lens 41, and then reaches the photodetector array 43. The photodetector array 43 converts the received echo laser pulse into a voltage signal depending on the intensity of the received echo laser pulse. The voltage signal is transmitted from the photodetector array 43 to the time measuring circuit 61 via the amplifier circuit 53. The control circuit 33 outputs the pulse of the drive signal to the time measuring circuit 61 also. The time measuring circuit 61 detects the time difference between the pulse of the drive signal and a pulse in the voltage signal. The time measuring circuit 61 generates distance data on the basis of the detected time difference. The time measuring circuit 61 outputs the distance data to the control circuit 33. When the voltage signal has a plurality of pulses, the time measuring circuit 61 detects the time differences between the pulse of the drive signal and the pluses in the voltage signal. The time measuring circuit 61 generates multi-lap distance data on the basis of the detected time differences. The time measuring circuit 61 outputs the multi-lap distance data to the control circuit 33. A RAM (not shown) within the control circuit 33 stores the distance data outputted from the time measuring circuit 61. The control circuit 33 corrects the time difference represented by the distance data in response to a response lag caused by the photodetector array 43 and a delay time caused by the amplifier circuit 53. The control circuit 33 calculates the distance L to the object on the basis of the correction-resultant time difference $\Delta t$ and the light velocity C according to an equation as "$L=C\cdot\Delta t/2$". The control circuit 33 generates accurate distance data representing the calculated distance L.

The accurate distance data may be replaced by data of another physical quantity indicating the accurate distance. For example, the accurate distance data may be replaced by the accurate time difference data. Specifically, the correction-resultant time difference $\Delta t$ which results from consideration of the response lag and the delay time may be used instead of the distance L. Preferably, the control circuit 33 generates such accurate distance data or accurate time difference data when receiving the output data from the time measuring circuit 61.

The control circuit 33 drives the scanner 49, thereby swinging the mirror 47 and causing the forward laser pulse beam to scan the detection area. The direction of the travel of the forward laser pulse beam is changed in an angular range of 16 degrees in a horizontal plane extending forward of the vehicle.

Figure 6:
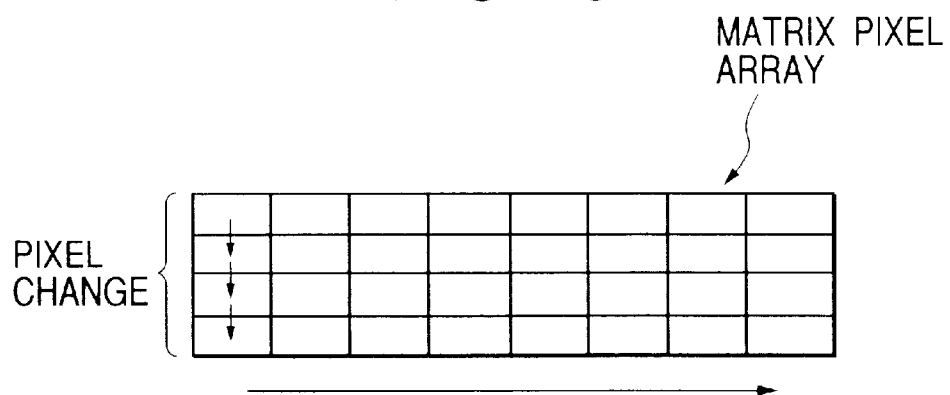
FIG. 6 is a diagram of a matrix pixel array.
Figure 7:
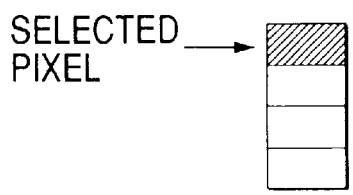
FIG. 7 is a diagram of photo detecting pixels in one column (one vertical-direction pixel group) in the matrix pixel array of FIG. 6.
Figure 8:
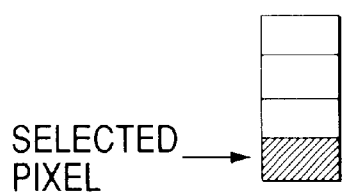
FIG. 8 is a diagram of photo detecting pixels in one column (one vertical-direction pixel group) in the matrix pixel array of FIG. 6.

At a same angular direction, a plurality of pulses of the forward laser beam are successively applied to the detection area. In this case, regarding the application of each of the pulses of the forward laser beam, the selected pixel (the activated pixel) is sequentially changed among the pixels in a vertical-direction pixel group in the photodetector array 43 while photo detection and distance measurement are implemented. As shown in FIG. 6, the selected pixel (the activated pixel) is sequentially changed among the pixels along the downward direction. Specifically, at a first stage, the uppermost pixel is selected as an active pixel (an actually used pixel) as shown in FIG. 7. At a second stage, the second uppermost pixel is selected as an active pixel. At a third stage, the second lowermost pixel is selected as an active pixel. At a fourth stage, the lowermost pixel is selected as an active pixel as shown in FIG. 8.

As previously mentioned, the angular dimensions of the scanned area are 4 degrees in the vertical direction (the vehicle height direction), and 16 degrees in the lateral direction (the vehicle width-wise direction). As an object moves upward in the scanned area, the position of a pixel receiving a related echo laser beam moves downward in the photodetector array 43. As the object moves downward in the scanned area, the position of a pixel receiving the related echo laser beam moves upward in the photodetector array 43. Therefore, the distance to an object in a lower part of the scanned area can be measured even when only the uppermost pixel is selected as an active pixel (an actually used pixel) as shown in FIG. 7. The distance to an object in an upper part of the scanned area can be measured even when only the lowermost pixel is selected as an active pixel as shown in FIG. 8.

During the scanning of the detection area by the forward laser pulse beam, the forward laser pulse beam is moved along the lateral direction (the vehicle width-wise direction). While the forward laser pulse beam remains in a same angular direction, the selected pixel (the activated pixel) is sequentially changed among the same-group pixels along the vertical direction (the vehicle height direction) perpendicular to the lateral direction (the vehicle width-wise direction). Thus, information of the position of an object in the vertical direction (the vehicle height direction) is available although the forward laser pulse beam is moved one-dimensionally along the lateral direction (the vehicle width-wise direction). Also, the scanning of the detection area by the forward laser pulse beam provides information of the position of the object in the lateral direction (the vehicle width-wise direction). Therefore, two-dimensional positional information of the object is available although the forward laser pulse beam is moved only one-dimensionally along the lateral direction (the vehicle width-wise direction).

Figure 9:
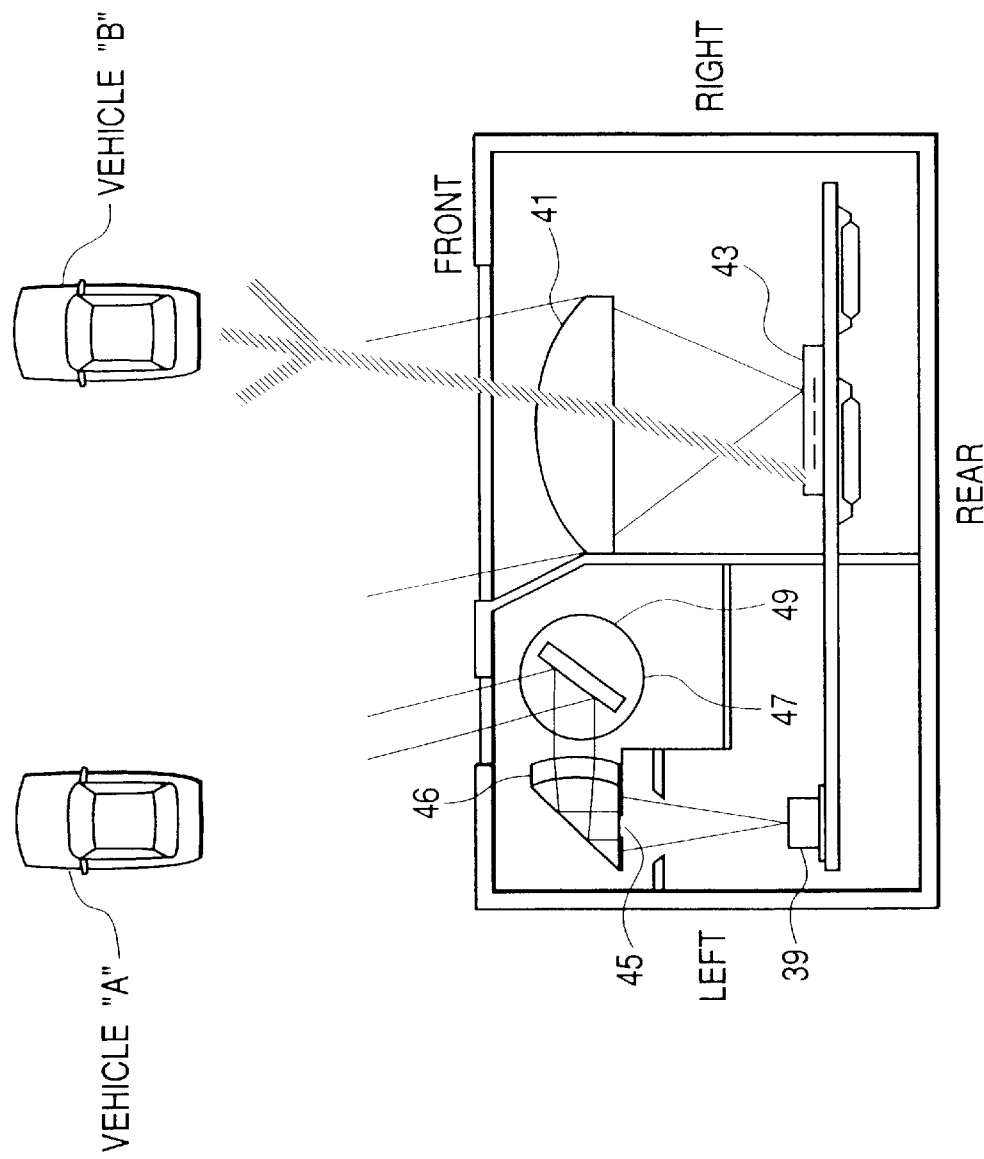
FIG. 9 is a diagram of vehicles and the distance measuring apparatus in FIG. 1.

As shown in FIG. 6, the matrix pixel array in the photodetector array 43 has a plurality of vertical-direction pixel groups (column-direction pixel groups) and a plurality of horizontal-direction pixel groups (row-direction pixel groups). In each horizontal-direction pixel group, one is selected from among the pixels as an active pixel (an actually used pixel) in accordance with the angular direction of the forward laser pulse beam. In this case, the selected pixel (the actually used pixel) is a pixel expected to receive an echo laser pulse beam. With reference to FIG. 9, in the case where a vehicle "A" is a distance measurement object, an echo laser pulse beam (a reflected laser pulse beam) from the object is expected to reach a right-hand part of the photodetector array 43 via the light receiving lens 41. A pixel expected to receive an echo laser pulse beam is identified, and only the identified pixel is selected as an active pixel (an actually used pixel).

As previously mentioned, in each horizontal-direction pixel group, one is selected from among the pixels as an active pixel (an actually used pixel) in accordance with the angular direction of the forward laser pulse beam. In this case, it is possible to reduce the adverse affection of stray light or noise light. With reference to FIG. 9, when a vehicle "B" is running on the opposite lane with respect to the present vehicle, a laser beam emitted from a distance measuring apparatus on the vehicle "B" is expected to reach a left-hand part of the photodetector array 43. During a time interval except the moment at which a correct echo laser pulse beam is expected to reach the left-hand part of the photodetector array 43, all the pixels in the left-hand part of the photodetector array 43 remain non-selected and inactive. Therefore, it is possible to prevent the adverse affection of the laser beam emitted from the vehicle "B".

Figure 10:
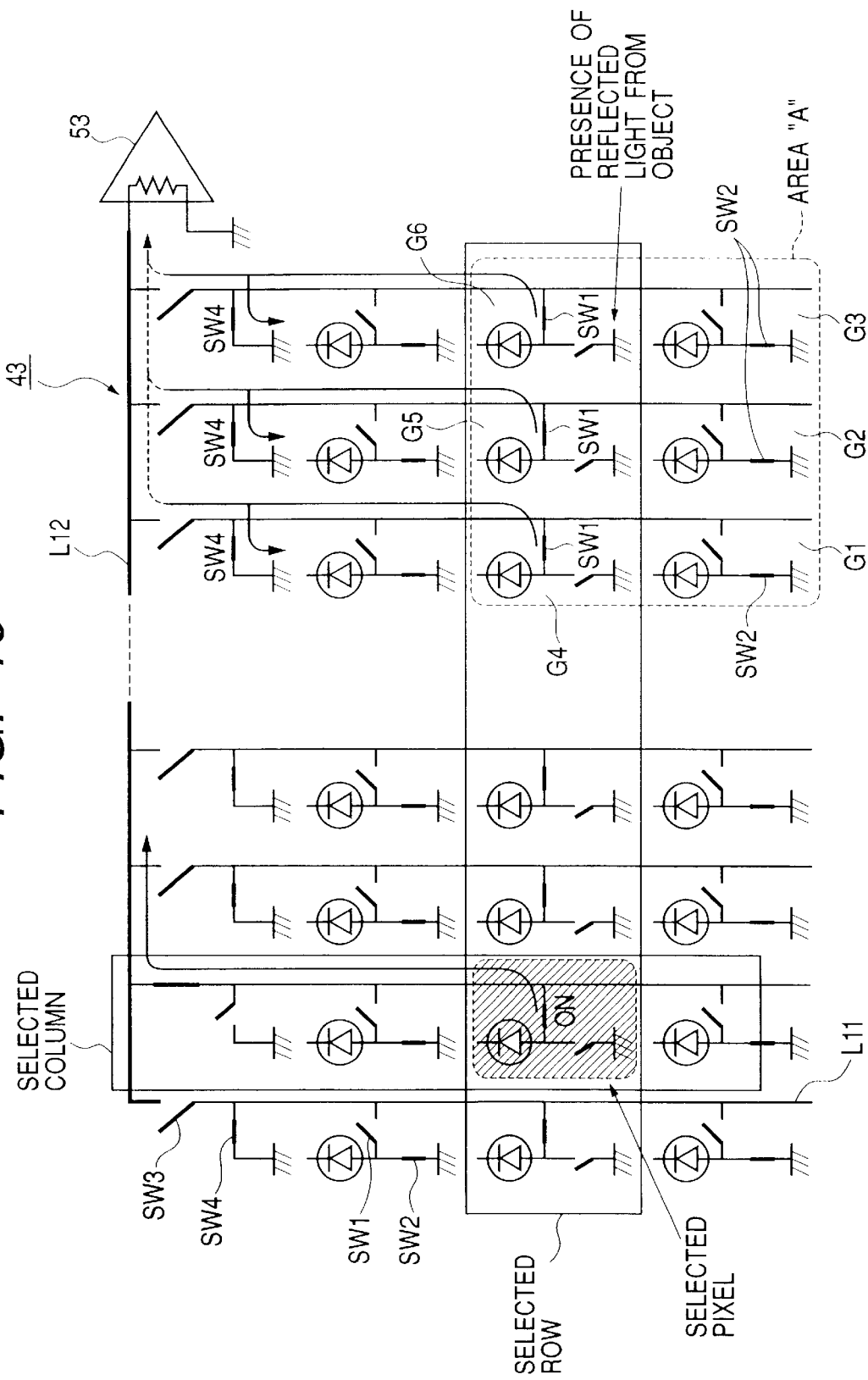
FIG. 10 is a schematic diagram of portions of a photodetector array and an amplifier circuit in FIG. 1.

As previously mentioned, regarding each non-selected pixel, the switch SW1 is set in its off state by the application of a low voltage to the related control line CL1 so that the photodiode PD is disconnected from the vertical-direction output line L11. At the same time, the switch SW2 is set in its on state by the application of a high voltage to the related control line CL2 so that the photodiode PD is connected to the ground line. FIG. 10 shows that an area "A" in the photodetector array 43 which is at least partially exposed to reflected light from an object has non-selected pixels G1, G2, and G3. The switches SW2 in the non-selected pixels G1, G2, and G3 connect the related photodiodes to the ground line. The connection of the photodiodes to the ground line by the switches SW2 prevents the leakage of electric signals from the photodiodes in the non-selected pixels G1, G2, and G3 toward the last-stage output line L12.

As previously mentioned, regarding each non-selected pixel, the switch SW3 is set in its off state by the application of a low voltage to the related control line CL3 so that the vertical-direction output line L11 is disconnected from the last-stage output line L12. At the same time, the switch SW4 is set in its on state by the application of a high voltage to the related control line CL4 so that the vertical-direction output line L11 is connected to the ground line. FIG. 10 shows that the photodiode array area "A" at least partially exposed to the reflected light from the object has non-selected pixels G4, G5, and G6 in which the switches SW1 connect the photodiodes to the vertical-direction output lines L11. The vertical-direction output lines L11 leading from the non-selected pixels G4, G5, and G6 are connected to the ground line by the switches SW4. The connection of the vertical-direction output lines L11 to the ground line by the switches SW4 prevents the leakage of electric signals from the non-selected pixels G4, G5, and G6 to the last-stage output line L12.

As understood from the above description, it is possible to prevent the leakage of electric signals from the non-selected pixels to the time measuring circuit 61 via the last-stage output line L12 and the amplifier circuit 53. Thus, only the photo detection electric signal generated by the selected pixel is transmitted to the time measuring circuit 61. Accordingly, it is possible to prevent a wrong measurement of the distance to the object.

The switches SW1, SW2, SW3, and SW4 correspond to first, second, third, and fourth switches in claims, respectively. The control lines CL1, CL2, CL3, and CIA correspond to first, second, third, and fourth control lines in claims, respectively. The processing section 32 corresponds to a processing circuit in claims. It can be thought that the time measuring circuit 61 corresponds to a processing circuit in claims. The vertical-direction output lines L11 and the last-stage output line L12 correspond to output lines in claims. The laser diode 39, the LD driver 40, and the scanning mechanism 35 correspond to light applying means in claims. The time measuring circuit 61 corresponds to time difference measuring means in claims. The control circuit 33 corresponds to distance calculating means in claims. The control circuit 33 and the pixel selector 50 correspond to changing and selecting means in claims.

Second Embodiment

Figure 11:
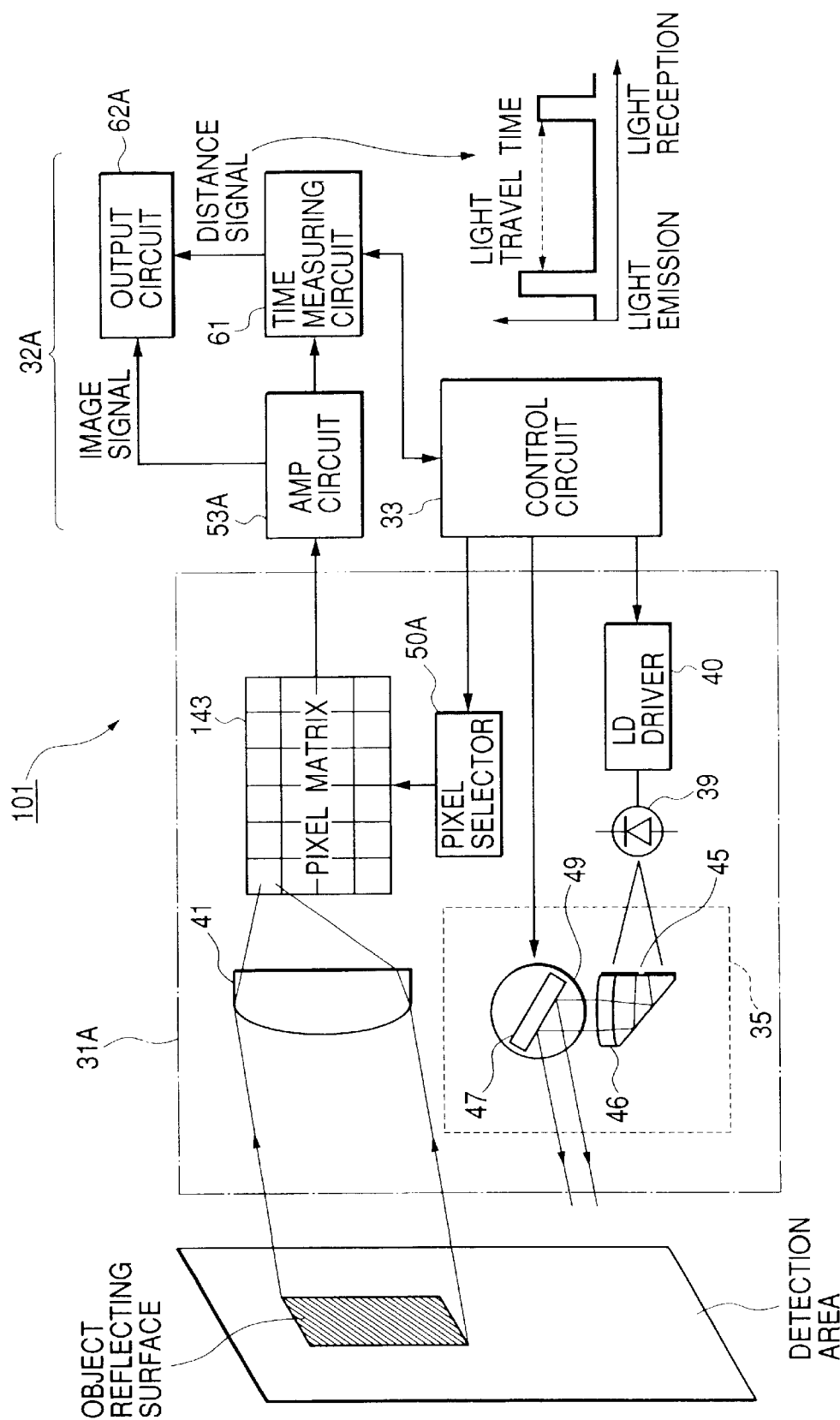
FIG. 11 is a diagram of a distance and image measuring apparatus according to a second embodiment of this invention.

FIG. 11 shows a distance and image measuring apparatus 101 according to a second embodiment of this invention. The distance and image measuring apparatus 101 is similar to the distance measuring apparatus 1 (see FIG. 1) except for design changes mentioned later.

The distance and image measuring apparatus 101 includes a transmitting/receiving section 31A instead of the transmitting/receiving section 31 in FIG. 1. The transmitting/receiving section 31A has a photodetector array 143 and a pixel selector 50A which replace the photodetector array 43 and the pixel selector 50 (see FIG. 1) respectively. The distance and image measuring apparatus 101 includes a processing section 32A instead of the processing section 32 in FIG. 1. The processing section 32A has an amplifier circuit 53A and an output circuit 62A which replace the amplifier circuit 53 and the output circuit 62 (see FIG. 1) respectively.

The photodetector array 143 is designed to output an image signal (a picture signal) to the amplifier circuit 53A. The amplifier circuit 53A transmits the image signal to the output circuit 62A. The number of control lines in the photodetector array 143 is greater than that in the photodetector array 43 (see FIG. 1). The pixel selector 50A is designed to adapt to the greater number of control lines.

The photodetector array 143 has an additional structure over the structure of the photodetector array 43 (see FIG. 1). The additional structure operates for generating an image signal.

Figure 12:
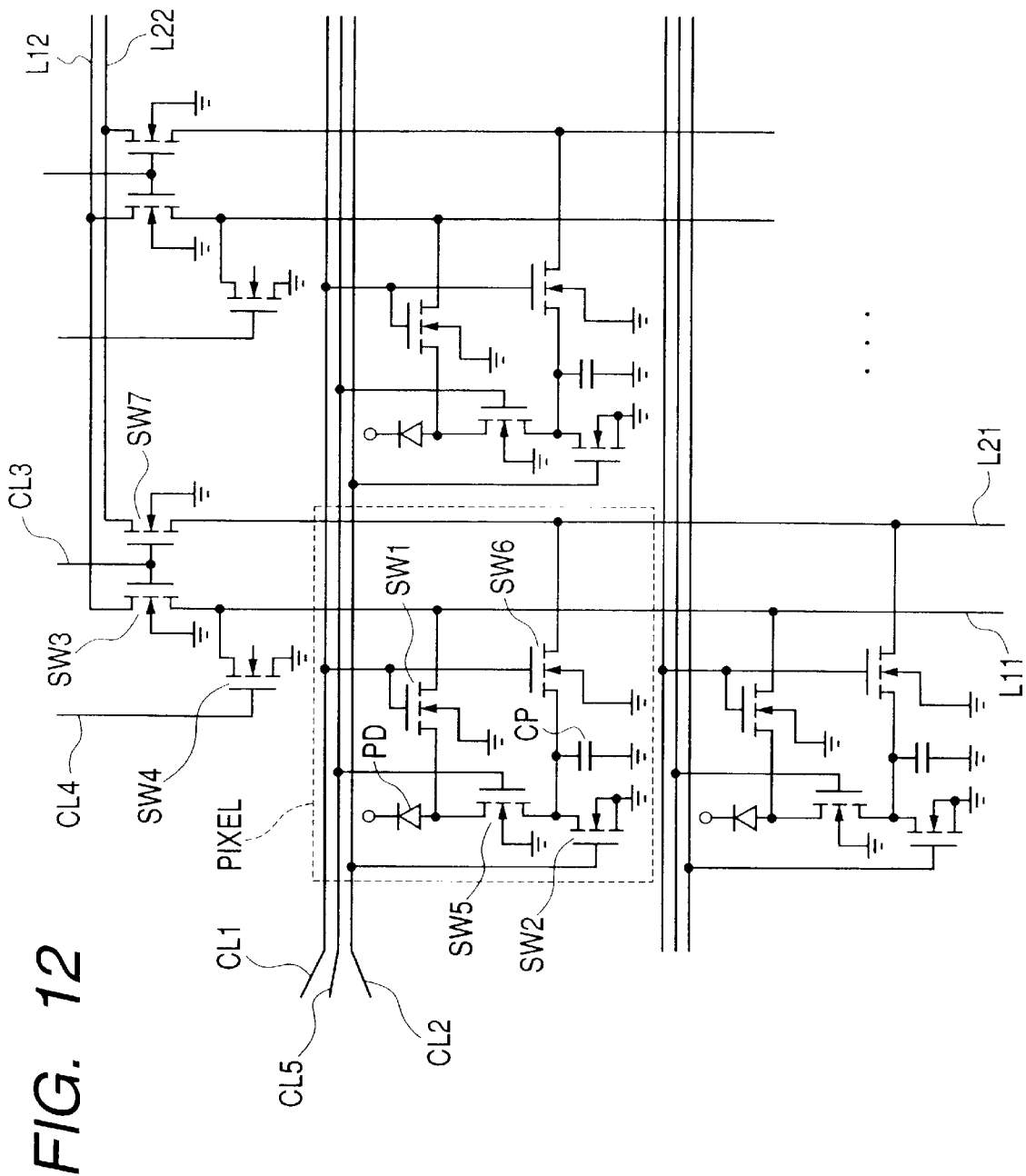
FIG. 12 is a schematic diagram of a portion of a matrix pixel array which forms a portion of a photodetector array in FIG. 11.
Figure 13:
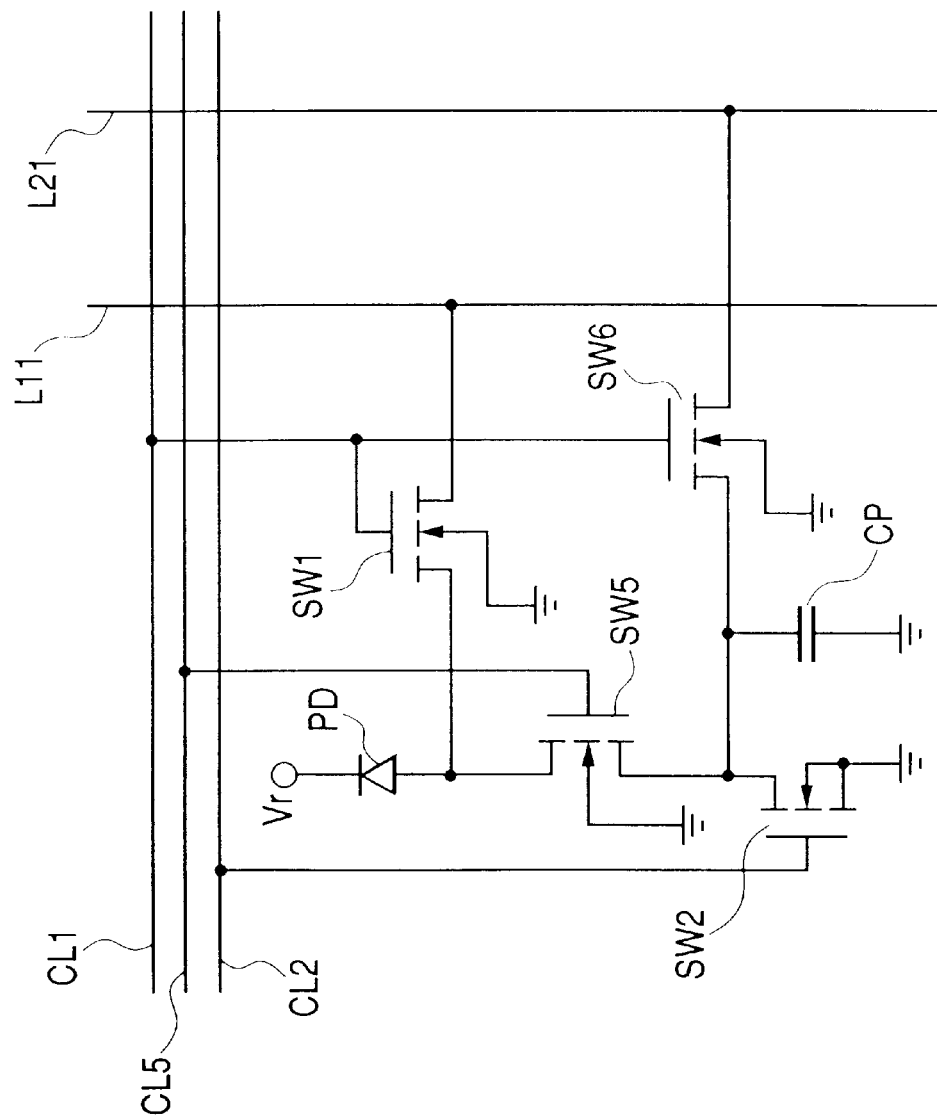
FIG. 13 is a schematic diagram of a portion of the matrix pixel array in FIG. 12.

FIG. 12 shows a portion of a matrix pixel array which forms a portion of the photodetector array 143. In FIG. 12, the region surrounded by the broken lines shows one photo detecting pixel. Also, FIG. 13 shows a portion of the matrix pixel array. As shown in FIGS. 12 and 13, each photo detecting pixel contains a photodiode PD, a switch SW1, a switch SW2, a switch SW5, a switch SW6, and a capacitor CP. The photodiode PD forms a photo detecting zone (a photo detecting region).

As shown in FIG. 12, the cathode of the photodiode PD is connected to a dc power feed line. The switch SW1 is connected between the anode of the photodiode PD and a vertical-direction output line L11. The switch SW1 is connected to a control line CL1. The switch SW5 is connected between the anode of the photodiode PD and a first end of the capacitor CP. The switch SW5 is connected to a control line CL5. A second end of the capacitor CP is connected to a ground line. The switch SW2 is connected across the capacitor CP. The switch SW2 is connected to a control line CL2. The switch SW6 is connected between the first end of the capacitor CP and an image-signal vertical-direction output line L21. The switch SW6 is connected to the control line CL1.

In the matrix pixel array, photo detecting pixels in each vertical-direction pixel group (each column-direction pixel group) are connected to a common vertical-direction output line L11 and also a common image-signal vertical-direction output line L21. In FIG. 12, the photodiode PD in the pixel is connected to the common vertical-direction output line L11 via the switch SW1, and the switch SW5 is connected to the junction between the photodiode PD and the switch SW1. When the switch SW5 is in its on state (SW5=ON), the photodiode PD and the capacitor CP are connected to each other. When the switch SW5 is in its off state (SW5=OFF), the photodiode PD and the capacitor CP are disconnected from each other. When the switch SW2 is in its on state (SW2=ON), the capacitor CP is discharged through the switch SW2. In this case, electric charges escape from the capacitor CP to a ground line. The switch SW6 operates on the capacitor CP as the switch SW1 operates on the photodetector. When the switch SW6 is in its on state (SW6=ON), an electric signal (a voltage signal or a current signal) caused by electric charges in the capacitor CP is transmitted to the image-signal vertical-direction output line L21 as a 1-pixel-corresponding image signal. In FIG. 12, similar to the switch SW1, the switch SW6 is controlled by a voltage at the control line CL1. Therefore, the switch SW6 is in its on state when the switch SW1 is in its on state. The switch SW6 is in its off state when the switch SW1 is in its off state. The switch SW5 is controlled by a voltage at the control line CL5.

One control line CL5 is common to all the pixels in each horizontal-direction pixel group (each row-direction pixel group). In this respect, the control lines CL5 are similar to the control lines CL1 and CL2. Therefore, the switches SW5 in all the pixels in each horizontal-direction pixel group are in their on states when a suitable voltage is applied to the related control line CL5.

The image-signal vertical-direction output lines L21 are connected to a single last-stage image-signal output line L22 which leads to the amplifier circuit 53A in the processing section 32A (see FIG. 11). An electric signal propagated along the last-stage output line L12 passes through the amplifier circuit 53A before reaching the time measuring circuit 61 and being fed to the output circuit 62 as a distance signal (see FIG. 11). On the other hand, an electric signal propagated along the last-stage image-signal output line L22 passes through the amplifier circuit 53A before being fed to the output circuit 62A as an image signal.

A switch SW7 is provided at the connection of each image-signal vertical-direction output line L21 to the last-stage image-signal output line L22. The switch SW7 selectively connects and disconnects the related image-signal vertical-direction output line L21 to and from the last-stage image-signal output line L12. The switch SW7 is connected to a control line CL3. Similar to the switch SW3, the switch SW7 is controlled via the control line CL3. Therefore, the switch SW7 is in its on state when the switch SW3 is in its on state. The switch SW7 is in its off state when the switch SW3 is in its off state.

The control lines CL1, CL2, CL3, CL4, and CL5 are connected to the pixel selector 50A provided in the transmitting/receiving section 31A (see FIG. 11). The device 50A selects at least one from among the pixels in the photodetector array 143 by applying suitable voltages to the control lines CL1, CL2, CL3, CL4, and CL5.

The selection of one from among the pixels in the photodetector array 143 and the outputting of an electric signal from the selected pixel to the processing section 32A will be described with reference to FIG. 14. Regarding each non-selected pixel, the switches SW1 and SW6 are set in their off states by the application of a low voltage to the related control line CL1 so that the photodiode PD is disconnected from the vertical-direction output line L11, and that the capacitor CP is disconnected from the image-signal vertical-direction output signal L21. At the same time, the switch SW5 is set in its on state by the application of a high voltage to the related control line CL5 so that the photodiode PD and the capacitor CP are connected to each other. Therefore, electric charges (photo-electrons) generated by the photodiode PD in response to applied background light or applied object-brightness-indicating light are stored into the capacitor CP. The amount of electric charges stored in the capacitor CP depends on the duration of the above-mentioned process. In addition, the switches SW3 and SW7 are set in their off states by the application of a low voltage to the related control line CL3. Therefore, the vertical-direction output line L11 is disconnected from the last-stage output line L12 while the image-signal vertical-direction output line L21 is disconnected from the last-stage image-signal output line L22. Furthermore, the switch SW4 is set in its on state by the application of a high voltage to the related control line CL4 so that the vertical-direction output line L11 is connected to the ground line.

Regarding a selected pixel, the switches SW1 and SW6 are set in their on states by the application of a high voltage to the related control line CL1 so that the photodiode PD is connected to the vertical-direction output line L11, and that the capacitor CP is connected to the image-signal vertical-direction output line L21. At the same time, the switches SW3 and SW7 are set in their on states by the application of a high voltage to the related control line CL3 so that the vertical-direction output line L11 is connected to the last-stage output line L12, and that the image-signal vertical-direction output line L21 is connected to the last-stage image-signal output line L22. At the same time, the switch SW4 is set in its off state by the application of a low voltage to the related control line CL4 so that the vertical-direction output line L11 is disconnected from the ground line. The photo detection electric signal generated by the photodiode PD in the selected pixel is transmitted to the vertical-direction output line L11 through the switch SW1. Then, the photo detection electric signal is transmitted from the vertical-direction output line L11 to the last-stage output line L12 through the switch SW3 before being outputted to the amplifier circuit 53A in the processing section 32A. The electric signal (the voltage signal or the current signal) caused by electric charges, which have been stored in the capacitor PD during the previous non-selected state of the present pixel, is transmitted to the image-signal vertical-direction output line L21 through the switch SW6 as the 1-pixel-corresponding image signal. Then, the 1-pixel-corresponding image signal is transmitted from the image-signal vertical-direction output line L21 to the last-stage image-signal output line L22 through the switch SW7 before being outputted to the amplifier circuit 53A in the processing section 32A.

Figure 14:
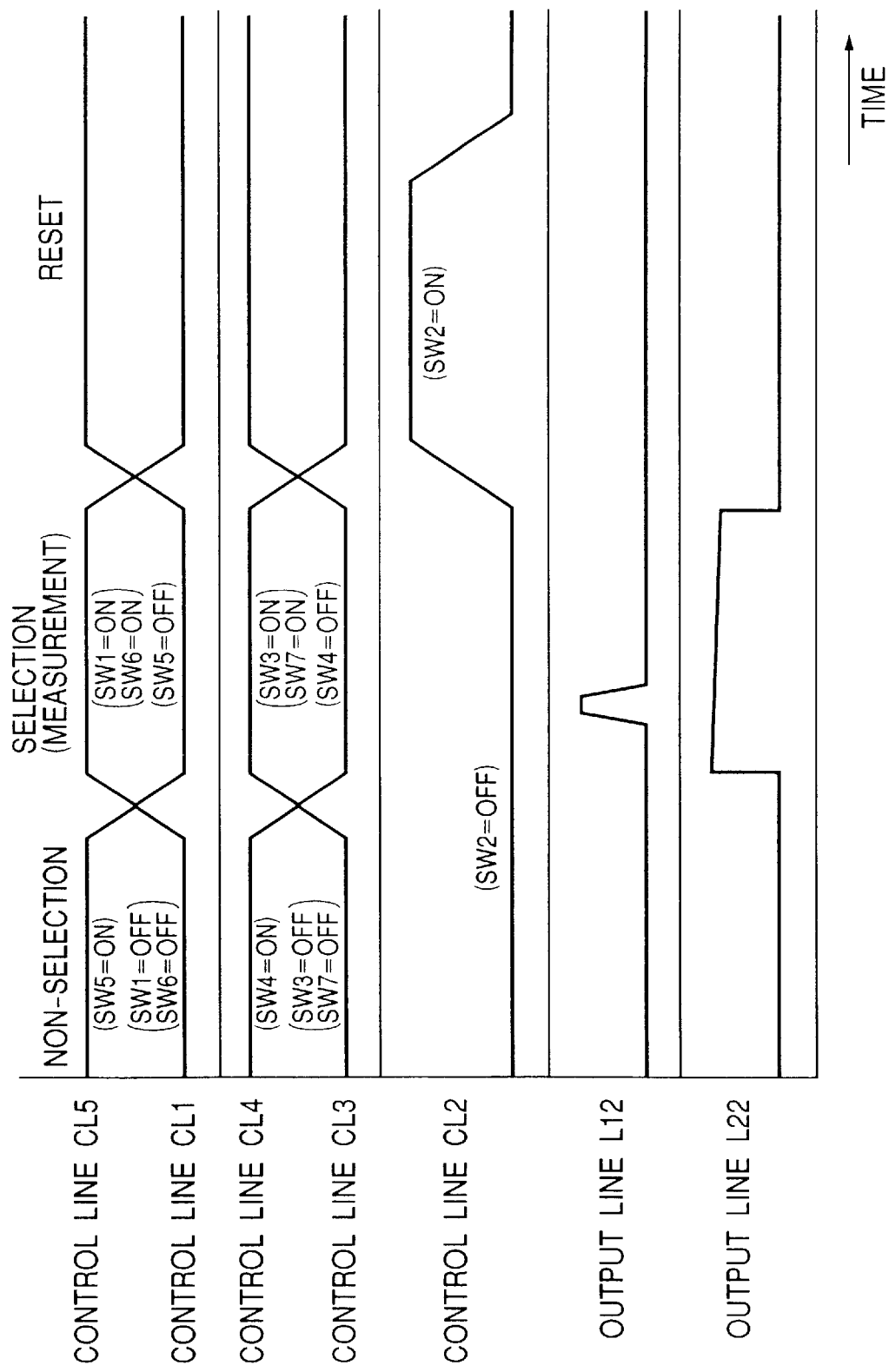
FIG. 14 is a time-domain diagram of signals which appear in various lines in FIG. 12.

As shown in FIG. 14, a low voltage is applied to the control line CL2 and hence the switch SW2 is in its off state when the present pixel is non-selected, and also when the present pixel is selected. During a predetermined time interval immediately after the end of the selection of the present pixel, the switch SW2 is set in its on state by the application of a high voltage to the control line CL2 so that the capacitor CP is discharged through the switch SW2. In this case, electric charges escape from the capacitor CP to the ground line. Thus, a resetting process is executed with respect to the capacitor CP.

The switches SW5, SW6, and SW7 correspond to fifth, sixth, and seventh switches in claims, respectively. The control lines CL5 correspond to a fifth control line in claims. The image-signal vertical-direction output lines L21 and the last-state image-signal output line L22 correspond to an image-signal output line in claims. The image-signal vertical-direction output lines L21 correspond to a common image-signal output line in claims.

In the second embodiment of this invention, a distance measurement uses a method of measuring the time interval between the moment of the emission of a pulse of a forward laser beam and the moment of the reception of a pulse of an echo laser beam. Accordingly, it is possible to accurately measure the distance between the present vehicle and a measurement object. The second embodiment of this invention has the additional function of measuring an image. The capacitor is provided in each of the pixels of the photodetector array 143 to implement an image measurement. In each pixel, the switch SW5 can disconnect the photodiode PD and the capacitor CP from each other. Thus, it is possible to execute a suitable image measurement while preventing a deterioration in high speed performances of the distance measurement.

The second embodiment of this invention can measure the distance to a measurement object and also an image of the measurement object. The second embodiment of this invention provides high speed performances of the distance measurement and a high sensitivity of the image capture. The distance and the image can be simultaneously measured by using only one photodetector array 143. Therefore, it is unnecessary to provide an optical axis adjustment which would be required if the distance and image measuring apparatus 101 is separated into a distance measuring apparatus and an image measuring apparatus. The distance measurement can be implemented without executing the image processing. In the case where the present vehicle is following a preceding vehicle and the distance between the vehicles remains constant, when the brightness of stop lamps of the preceding vehicle changes, it is possible to properly grasp the brightness change. When an auto-cruise system using the distance and image measuring apparatus 101 controls the present vehicle to follow a preceding vehicle, a high accuracy of the detection of the preceding vehicle is available provided that the measured distance and the measured image are used complementarily. Specifically, even in the case where the distance between the vehicles remains constant, a deceleration of the preceding vehicle can be predicted if the brightness of the stop lamps of the preceding vehicle changes. Thus, more suitable cruise control is available.

Since the accuracy of the detection of an object can be enhanced by complementarily using the measured distance and the measured image, it is possible to provide the following advantage. In some cases, the reflectivity of a measurement object with respect to an applied laser beam significantly depends on the color of the measurement object. A more suitable distance measurement can be implemented when the intensity of the forward laser pulse beam is changed in response to the measured image.

Third Embodiment

Figure 15:
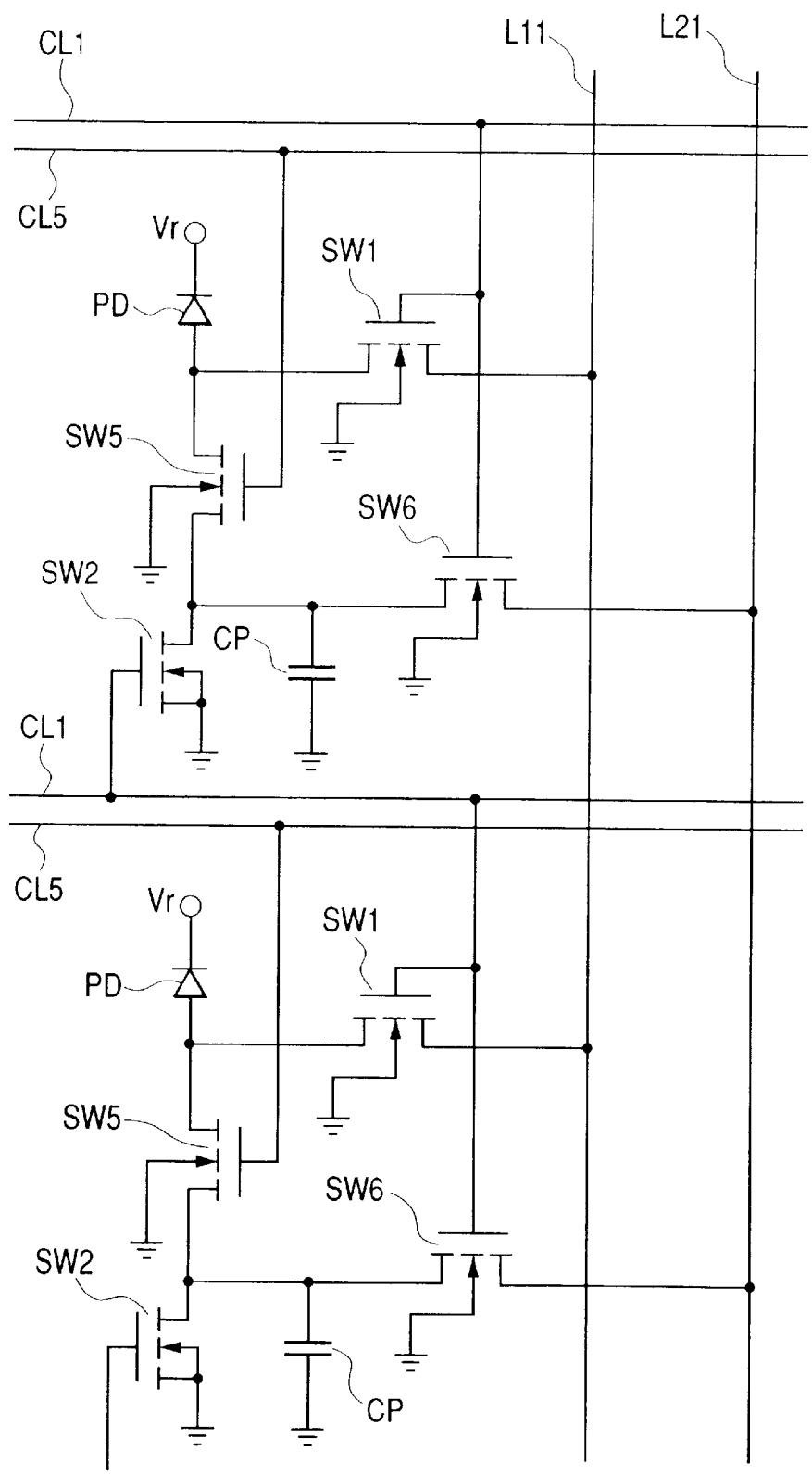
FIG. 15 is a schematic diagram of a portion of a matrix pixel array which forms a portion of a photodetector array in a third embodiment of this invention.

A third embodiment of this invention is a modification of the second embodiment thereof. In the third embodiment of this invention, as shown in FIG. 15, the control lines CL2 (see FIGS. 12 and 13) are omitted, and the switch SW2 in each pixel (except the lowermost pixels) is connected to a control line CL1 for the next pixel on the lower side. Thus, the switch SW2 in each pixel is controlled via the control line CL1 for the next pixel on the lower side. Specifically, the switch SW2 in each pixel is set in its on state when a high voltage is applied to the control line CL1 for the next pixel on the lower side. The switch SW2 in each lowermost pixel is connected to a control line CL1 for the uppermost pixels. Thus, the switch SW2 in each lowermost pixel is controlled via the control line CL1 for the uppermost pixels. Specifically, the switch SW2 in each lowermost pixel is set in its on state when a high voltage is applied to the control line CL1 for the uppermost pixels.

Fourth Embodiment

Figure 16:
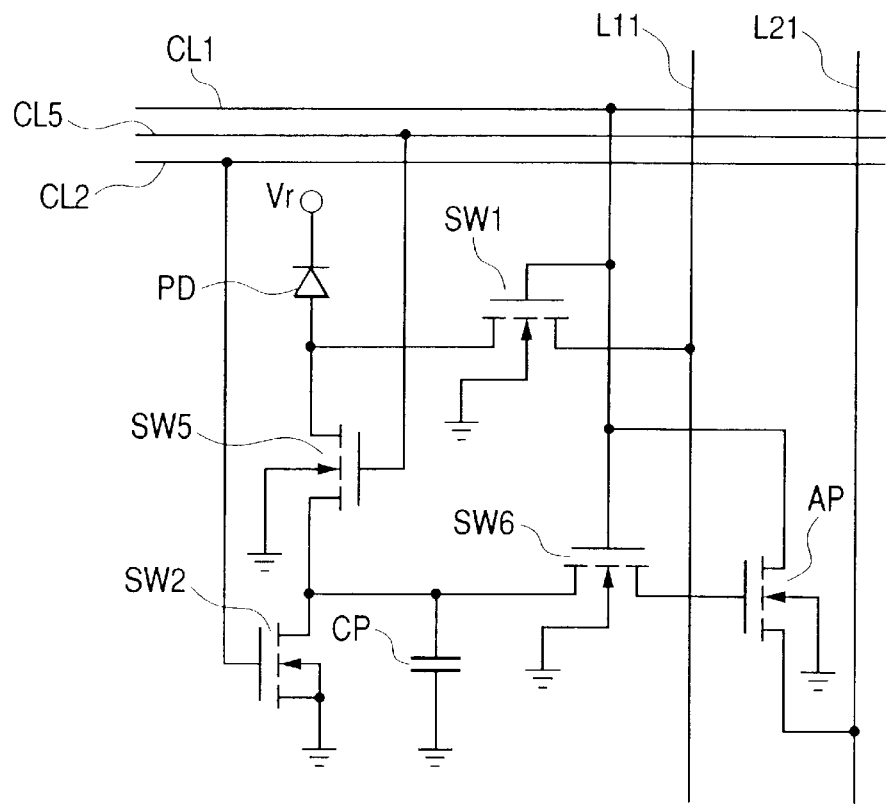
FIG. 16 is a schematic diagram of a portion of a matrix pixel array which forms a portion of a photodetector array in a fourth embodiment of this invention.

A fourth embodiment of this invention is a modification of the second embodiment thereof. In the fourth embodiment of this invention, as shown in FIG. 16, an amplifier AP is provided between each switch SW6 and a related image-signal vertical-direction output line L21. Even when only a small amount of charges is stored in the capacitor CP, the amplifier AP outputs a suitable-level image signal.

Fifth Embodiment

Figure 17:
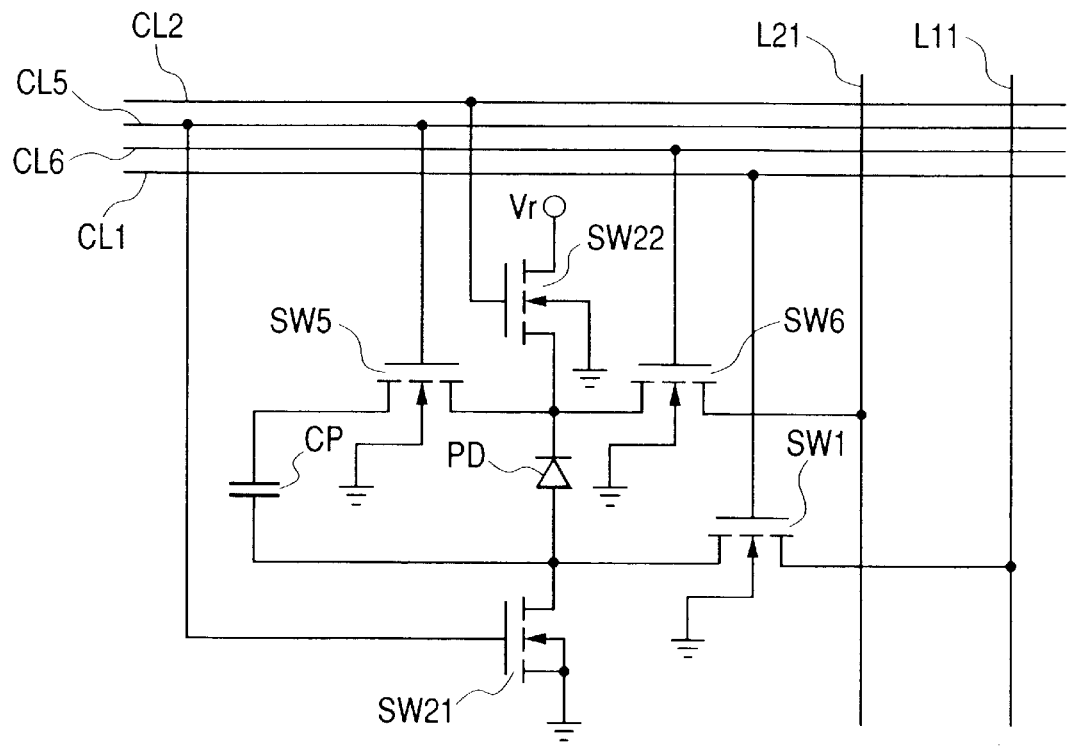
FIG. 17 is a schematic diagram of a portion of a matrix pixel array which forms a portion of a photodetector array in a fifth embodiment of this invention.

A fifth embodiment of this invention is a modification of the second embodiment thereof. FIG. 17 shows one photo detecting pixel in the photodetector array in the fifth embodiment of this invention. As shown in FIG. 17, the pixel includes switches SW1, SW5, SW6, SW21, and SW22, a photodiode PD, and a capacitor CP. The switch SW21 is provided between the anode of the photodiode PD and a ground line. The switch SW21 is connected to a control line CL5. The switch SW22 is provided between a dc power feed line and the cathode of the photodiode PD. The switch SW22 is connected to a control line CL2. The junction between the switch SW21 and the photodiode PD is connected via the switch SW1 to a vertical-direction output line L11. The switch SW1 is connected to a control line CL1. The junction between the switch 22 and the photodiode PD is connected via the switch SW6 to an image-signal vertical-direction output line L21. The switch SW6 is connected to a control line CL6. The switch SW5 is provided between the cathode of the photodiode PD and one end of the capacitor CP. The switch SW5 is connected to the control line CL5. The other end of the capacitor CP is connected to the anode of the photodiode PD.

Before image detection, the capacitor CP is precharged via the switches SW5 and SW22. When the switch SW5 is in its on state, the capacitor CP is discharged in accordance with a brightness-dependent signal generated by the photodiode PD.

The switch SW1 selectively connects and disconnects the photodiode PD to and from the vertical-direction output line L11. The switch SW1 can be controlled via the control line 1. While the switch SW5 remains in its on state, the switch SW6 selectively connects and disconnects the capacitor CP to and from the image-signal vertical-direction output line L21. The switch SW6 can be controlled via the control line CL6. Thus, the timing of the outputting of a photo detection electric signal from the photodiode PD and the timing of the outputting of a 1-pixel-corresponding image signal from the capacitor CP can be controlled independently of each other.

Figure 18:
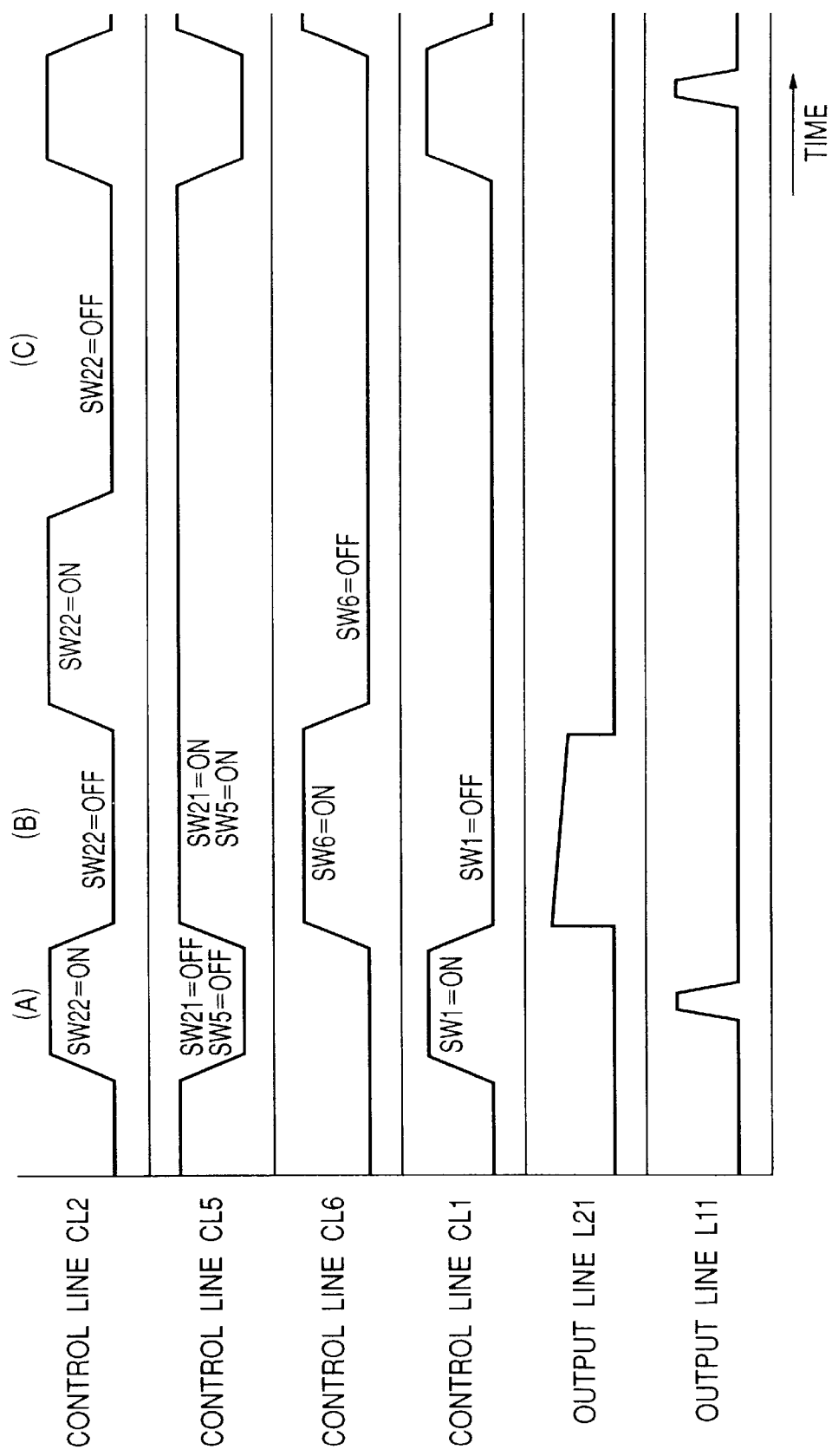
FIG. 18 is a time-domain diagram of signals which appear in various lines in FIG. 17.

With reference to FIG. 18, during a time interval (A), a photo detection electric signal is transmitted from the photodiode PD to the output side as follows. The switch SW1 is set in its on state by the application of a high voltage to the control line CL1 so that the photodiode PD is connected to the vertical-direction output line L11. At the same time, the switch SW6 is set in its off state by the application of a low voltage to the control line CL6 so that the capacitor CP is disconnected from the image-signal vertical-direction output line L21. In addition, the switch SW22 is set in its on state by the application of a high voltage to the control line CL2. Furthermore, the switches SW5 and SW21 are set in their off states by the application of a low voltage to the control line CL5. Thus, the photodiode PD is subjected to a reverse bias. Therefore, the photodiode PD generates a photo detection electric signal. The photo detection electric signal is transmitted to the vertical-direction output line L11 through the switch SW1.

During a time interval (B) immediately following the time interval (A), a 1-pixel-corresponding image signal is transmitted from the capacitor CP to the output side as follows. The switch SW1 is set in its off state by the application of a low voltage to the control line CL1. At the same time, the switch SW6 is set in its on state by the application of a high voltage to the control line CL6. In addition, the switch SW22 is set in its off state by the application of a low voltage to the control line CL2. Furthermore, the switches SW5 and SW21 are set in their on states by the application of a high voltage to the control line CL5. Accordingly, there occurs an electrically-conductive path extending between the ground line and the image-signal vertical-direction output line L21 via the switch SW21, the capacitor CP, the switch SW5, and the switch SW6. During an immediately-preceding operation cycle, after the completion of precharging the capacitor CP, the capacitor CP has been discharged in accordance with a brightness-dependent signal generated by the photodiode PD. Thus, during the immediately-preceding operation cycle, the dc voltage across the capacitor CP has dropped. During the time interval (B), the dropped-voltage signal is transmitted from the capacitor CP to the image-signal vertical-direction output line L21 as a 1-pixel-corresponding image signal.

After the time interval (B), the capacitor CP is precharged as follows. The switch SW6 is set in its off state by the application of the low voltage to the control line CL6. At the same time, the switch SW22 is set in its on state by the application of the high voltage to the control line CL2. In this case, an electric current flows between the dc power feed line and the ground line through the switch SW22, the switch SW5, the capacitor CP, and the switch SW21 so that the capacitor CP is charged to a fixed dc level.

In the fifth embodiment of this invention, a fixed dc voltage is applied to the capacitor CP, and hence electric charges are stored therein. Thus, the capacitor CP is precharged. The capacitor CP, the switch SW5, and the photodiode PD form a closed circuit. After the precharge, the photodiode PD causes an electric current to flow in the closed circuit in accordance with applied light so that the capacitor CP is discharged to a dc level depending on the intensity (the brightness) of the applied light. The discharge-resultant dc voltage across the capacitor CP is used as a 1-pixel-corresponding image signal.

With reference back to FIG. 18, during a time interval (C) which immediately follows the precharge, the switch SW22 is set in its off state by the application of the low voltage to the control line CL2 so that the capacitor CP is discharged in accordance with a brightness-dependent signal generated by the photodiode PD. During a time interval (B) in the next operation cycle, the discharge-resultant dc voltage across the capacitor CP is transmitted to the image-signal vertical-direction output line L21 as a 1-pixel-corresponding image signal.

Sixth Embodiment

Figure 19:
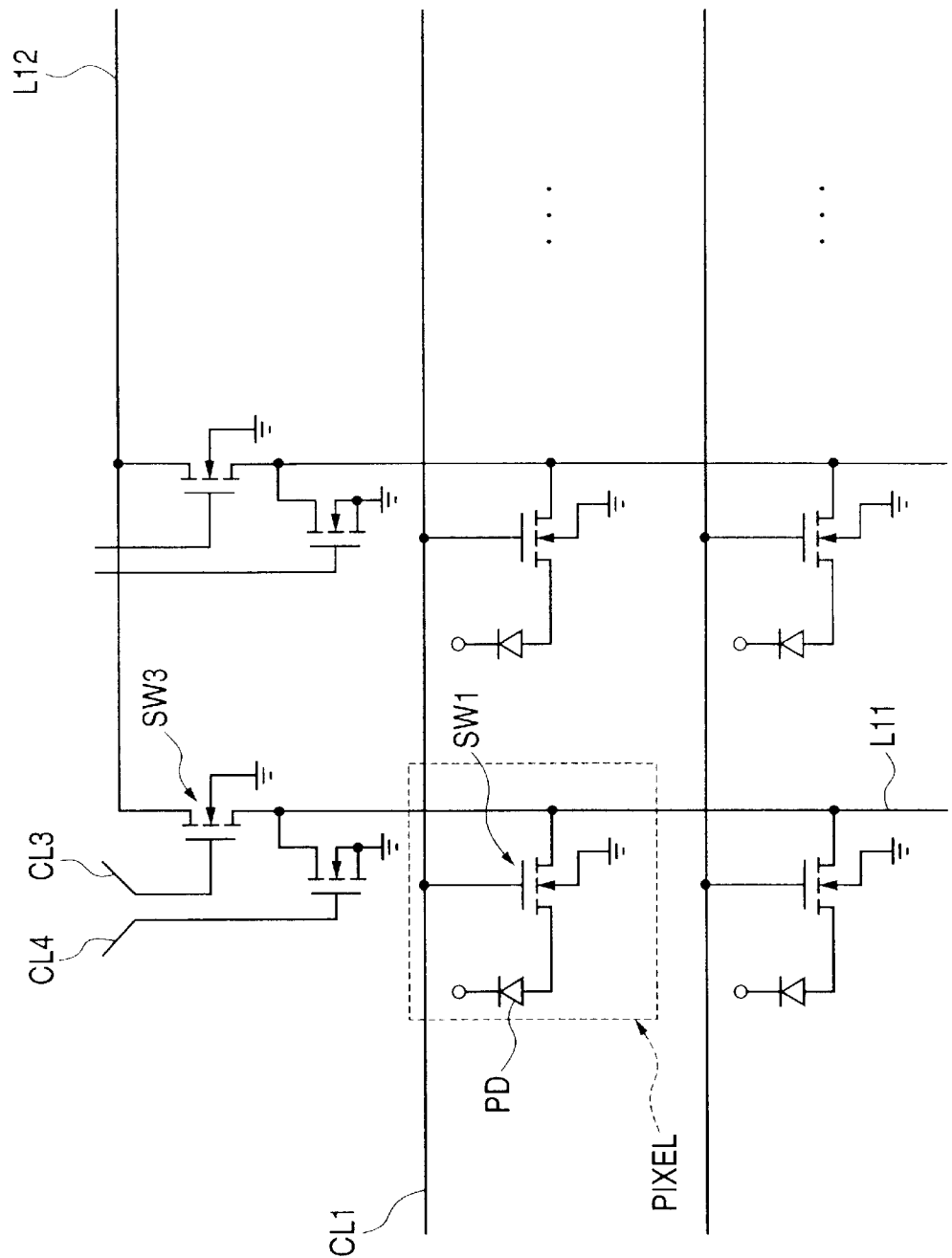
FIG. 19 is a schematic diagram of a portion of a matrix pixel array which forms a portion of a photodetector array in a sixth embodiment of this invention.

A sixth embodiment of this invention is a modification of the first embodiment thereof. FIG. 19 shows a portion of a matrix pixel array (a photodetector array) in the sixth embodiment of this invention. In FIG. 19, the region surrounded by the broken lines shows one photo detecting pixel. Each pixel contains a photodiode PD and a switch SW1. The switch SW2 (see FIG. 2) is omitted from the pixel.

As shown in FIG. 19, the cathode of the photodiode PD is connected to a dc power feed line. The switch SW1 is provided between the anode of the photodiode PD and a vertical-direction output line L11. The switch SW1 is connected to a control line CL1. When the switch SW1 is in its on state, a photo detection electric signal generated by the photodiode PD is transmitted to the vertical-direction output line L1.

During a first selecting process in which a high voltage is applied to only one of the control lines CL1 while a low voltage is applied to the other control lines CL1, only the switches SW1 connected to the high-voltage control line CL1 are in their on states and the other switches SW1 are in their off states. Thus, in this case, one is selected from among the horizontal-direction pixel groups (the row-direction pixel groups) in accordance with the high-voltage control line CL1. During a second selecting process in which a high voltage is applied to only one of the control lines CL3 while a low voltage is applied to the other control lines CL3 and all the control lines CL4, only the switches SW3 connected to the high-voltage control line CL3 are in their on states and the other switches SW3 and all the switches SW4 are in their off states. Thus, in this case, one is selected from among the vertical-direction pixel groups (the row-direction pixel groups) in accordance with the high-voltage control line CL3. The combination of the first selecting process and the second selecting process finally selects one from among the pixels which is located at the intersection between the selected horizontal-direction pixel group and the selected vertical-direction pixel group. It should be noted that two or more pixels can be simultaneously selected. The photo detection electric signal generated by the photodiode PD in the selected pixel is outputted from the photodetector array to the amplifier circuit 53 in the processing section 32 (see FIG. 1).

A description will be made about the outputting of a photo detection electric signal from the photodetector array to the processing section 32 (see FIG. 1). Regarding each non-selected pixel, the switch SW1 is set in its off state by the application of a low voltage to the related control line CL1 so that the photodiode PD is disconnected from the vertical-direction output line L11. At the same time, the switch SW3 is set in its off state by the application of a low voltage to the related control line CL3 so that the vertical-direction output line L11 is disconnected from the last-stage output line L12. On the other hand, the switch SW4 is set in its on state by the application of a high voltage to the related control line CIA so that the vertical-direction output line L11 is connected to the ground line. The connection of the vertical-direction output line L11 to the ground line by the switch SW4 prevents high-frequency noise from being propagated from the photodiode PD in the non-selected pixel to the last-stage output line L12 through capacitive couplings over the off-state switches SW1 and SW3.

Regarding a selected pixel, the switch SW1 is set in its on state by the application of a high voltage to the related control line CL1 so that the photodiode PD is connected to the vertical-direction output line L11. At the same time, the switch SW3 is set in its on state by the application of a high voltage to the related control line CL3 so that the vertical-direction output line L11 is connected to the last-stage output line L12. On the other hand, the switch SW4 is set in its off state by the application of a low voltage to the related control line CL4 so that the vertical-direction output line L11 is disconnected from the ground line. The photo detection electric signal generated by the photodiode PD in the selected pixel is transmitted to the vertical-direction output line L11 through the switch SW1. Then, the photo detection electric signal is transmitted from the vertical-direction output line L11 to the last-stage output line L12 through the switch SW3 before being outputted to the amplifier circuit 53 in the processing section 32 (see FIG. 1).

Seventh Embodiment

Figure 20:
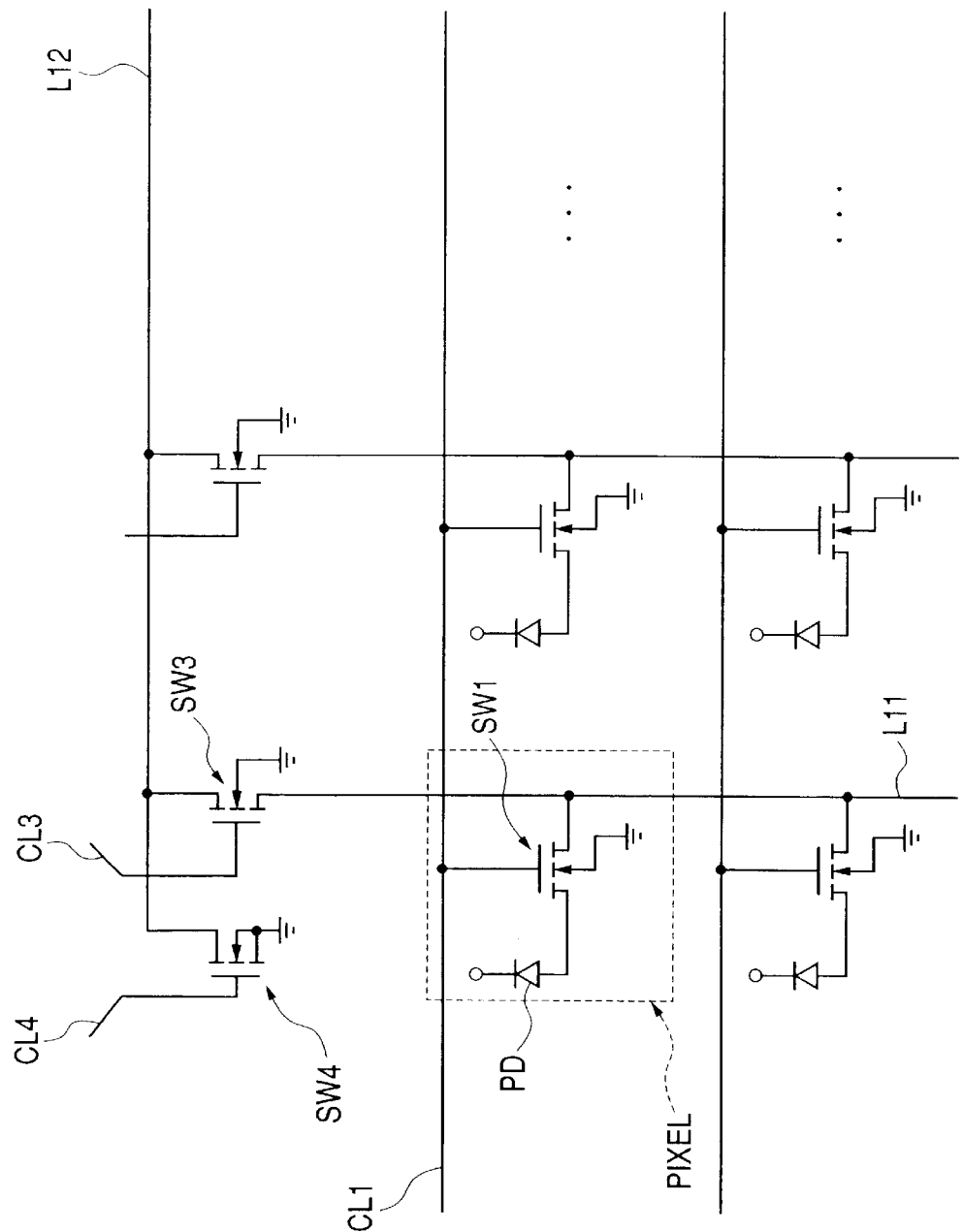
FIG. 20 is a schematic diagram of a portion of a matrix pixel array which forms a portion of a photodetector array in a seventh embodiment of this invention.

A seventh embodiment of this invention is a modification of the sixth embodiment thereof. FIG. 20 shows a portion of a matrix pixel array (a photodetector array) in the seventh embodiment of this invention. As shown in FIG. 20, a single switch SW4 is provided between a last-stage output line L12 and a ground line. The switch SW4 is connected to a control line CL4. When the switch SW4 is in its on state, all the pixels in the matrix pixel array remain non-selected. Change of the switch SW4 to its on state allows the escape of unwanted electric charges to the ground line.

Eighth Embodiment

An eighth embodiment of this invention is similar in structure to the sixth embodiment or the seventh embodiment thereof. The eighth embodiment of this invention is designed so that a switch SW4 can protect the processing section 32 (see FIG. 1) against an instantaneous great electric current.

Figure 21:
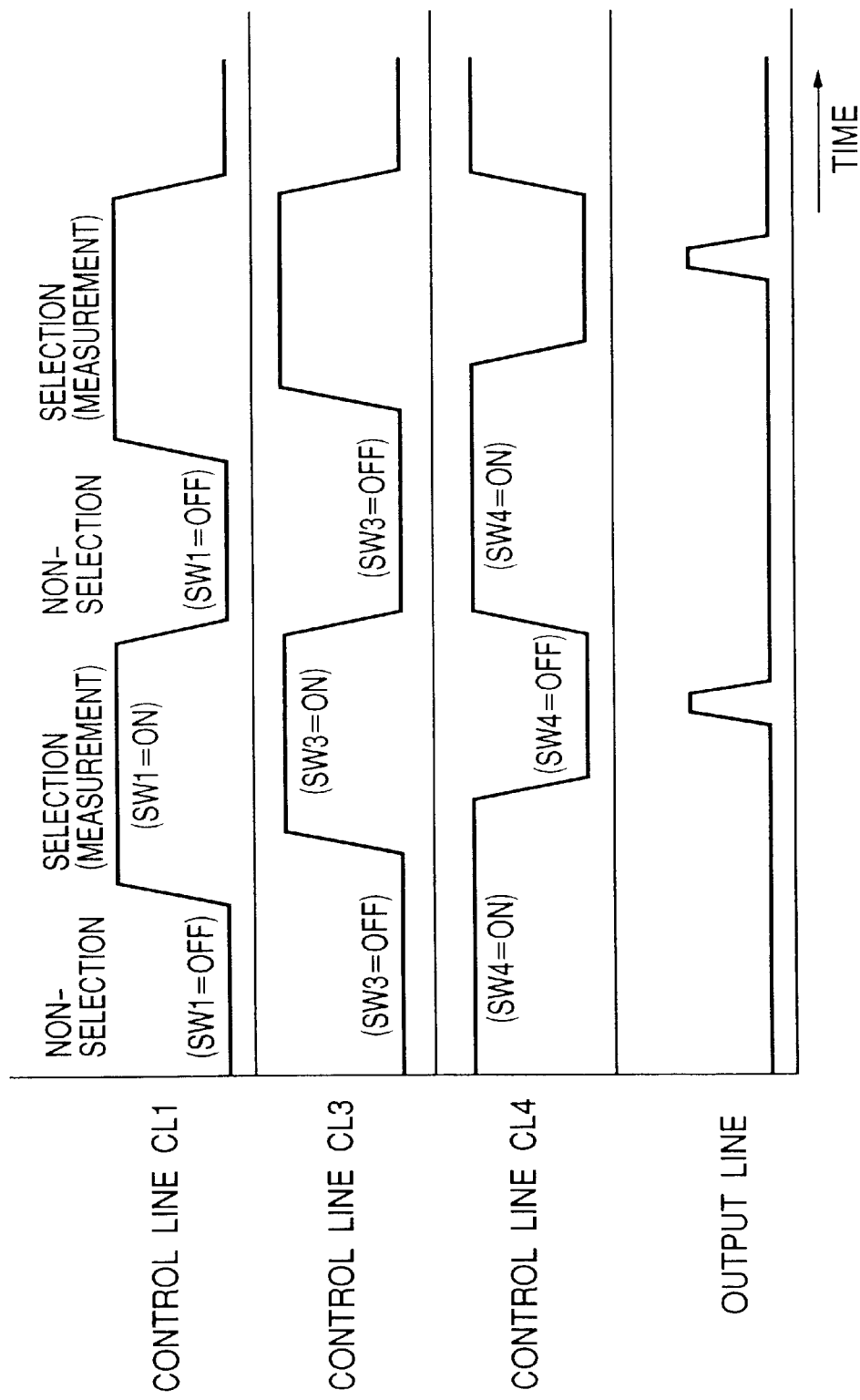
FIG. 21 is a time-domain diagram of signals which appear in various lines in an eighth embodiment of this invention.

Operation of the eighth embodiment of this invention will be described with reference to FIG. 21. Regarding each non-selected pixel, the switch SW1 is set in its off state by the application of a low voltage to the related control line CL1 so that the photodiode PD is disconnected from the vertical-direction output line L11. At the same time, the switch SW3 is set in its off state by the application of a low voltage to the related control line CL3 so that the vertical-direction output line L11 is disconnected from the last-stage output line L12. On the other hand, the switch SW4 is set in its on state by the application of a high voltage to the related control line CL4 so that the vertical-direction output line L11 is connected to the ground line.

Then, the switches SW1 and SW3 are changed to their on states in the following order. First, the switch SW1 is changed to its on state. Then, the switch SW3 is changed to its on state. At the moment of the change of the switch SW3 to its on state, the switch SW4 is held in its on state. Thus, even in the presence of accumulated electric charges, a great electric current is prevented from flowing into the last-stage output line L12 at a timing of pixel selection. Thereafter, the switch SW4 is changed to its off state. Accordingly, the switches SW1 and SW3 cause the related pixel to normally act as a selected pixel. A photo detection electric signal having a suitable current level is transmitted via the related vertical-direction output line L11 to the last-stage output line L12.

During a subsequent stage, when the present pixel is designated as a non-selected pixel, the switches SW1 and SW3 are changed to their off states and the switch SW4 is changed to its on state. In this case, the timings of the changes of the switches SW1, SW3, and SW4 may be the same.

The switches SW1, SW3, and SW4 correspond to first, third, and fourth switches in claims, respectively. The vertical-direction output lines L11 correspond to pixel-group output lines in claims. The last-stage output line L12 corresponds to an output line in claims.

Ninth Embodiment

Figure 22:
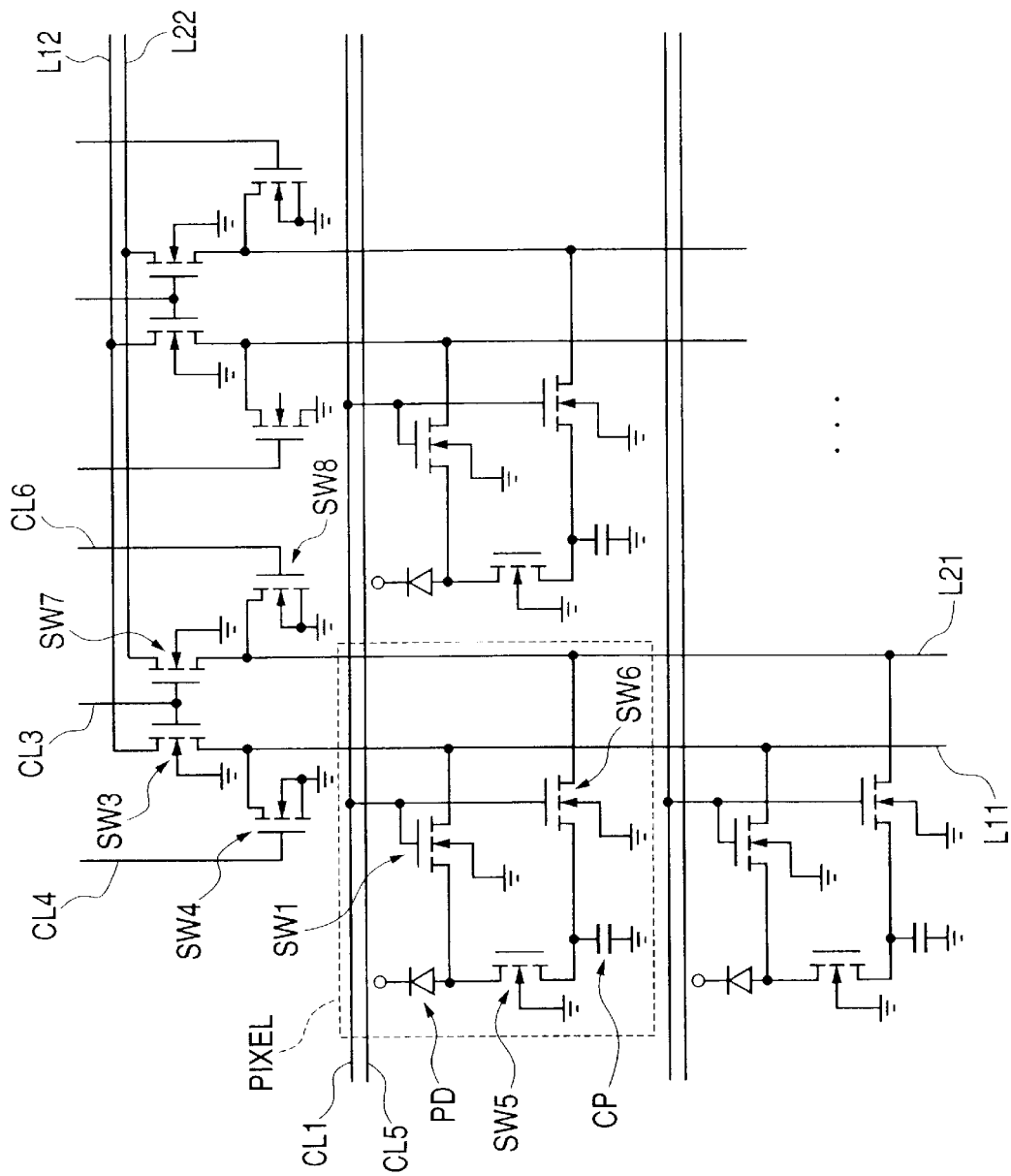
FIG. 22 is a schematic diagram of a portion of a matrix pixel array which forms a portion of a photodetector array in a ninth embodiment of this invention.

A ninth embodiment of this invention is a modification of the second embodiment thereof. FIG. 22 shows a portion of a matrix pixel array (a photodetector array) in the ninth embodiment of this invention. As shown in FIG. 22, a switch SW8 is connected between each image-signal vertical-direction output line L21 and a ground line. The switch SW8 is connected to a control line CL6. The switch SW8 can be controlled via the control line CL6. The switch SW2 (see FIG. 12) is omitted from each pixel.

Regarding each non-selected pixel, the switches SW1 and SW6 are set in their off states by the application of a low voltage to the related control line Cl1 so that the photodiode PD is disconnected from the vertical-direction output line L11, and that the capacitor CP is disconnected from the image-signal vertical-direction output signal L21. At the same time, the switch SW5 is set in its on state by the application of a high voltage to the related control line CL5 so that the photodiode PD and the capacitor CP are connected to each other. Therefore, electric charges (photo-electrons) generated by the photodiode PD in response to applied background light or applied object-brightness-indicating light are stored into the capacitor CP. The amount of electric charges stored in the capacitor CP depends on the duration of the above-mentioned process. In addition, the switches SW3 and SW7 are set in their off states by the application of a low voltage to the related control line CL3. Therefore, the vertical-direction output line L11 is disconnected from the last-stage output line L12 while the image-signal vertical-direction output line L21 is disconnected from the last-stage image-signal output line L22. Furthermore, the switch SW4 is set in its on state by the application of a high voltage to the related control line CL4 so that the vertical-direction output line L11 is connected to the ground line.

Regarding a selected pixel, the switches SW1 and SW6 are set in their on states by the application of a high voltage to the related control line CL1 so that the photodiode PD is connected to the vertical-direction output line L11, and that the capacitor CP is connected to the image-signal vertical-direction output line L21. At the same time, the switches SW3 and SW7 are set in their on states by the application of a high voltage to the related control line CL3 so that the vertical-direction output line L11 is connected to the last-stage output line L12, and that the image-signal vertical-direction output line L21 is connected to the last-stage image-signal output line L22. At the same time, the switch SW4 is set in its off state by the application of a low voltage to the related control line CL4 so that the vertical-direction output line L11 is disconnected from the ground line. The photo detection electric signal generated by the photodiode PD in the selected pixel is transmitted to the vertical-direction output line L11 through the switch SW1. Then, the photo detection electric signal is transmitted from the vertical-direction output line L11 to the last-stage output line L12 through the switch SW3 before being outputted to the amplifier circuit 53A in the processing section 32A (see FIG. 11). The electric signal (the voltage signal or the current signal) caused by electric charges, which have been stored in the capacitor PD during the previous non-selected state of the present pixel, is transmitted to the image-signal vertical-direction output line L21 through the switch SW6 as the 1-pixel-corresponding image signal. Then, the 1-pixel-corresponding image signal is transmitted from the image-signal vertical-direction output line L21 to the last-stage image-signal output line L22 through the switch SW7 before being outputted to the amplifier circuit 53A in the processing section 32A (see FIG. 11).

The switch SW8 is normally held in its off state by the application of a high voltage to the related control line CL6 so that the image-signal vertical-diction output line L21 is disconnected from the ground line. During a predetermined time interval in a later part of the term of selection of a related pixel, the switch SW8 is set in its on state by the application of a high voltage to the related control line CL6 so that the image-signal vertical-diction output line L21 is connected to the ground line. In this case, the capacitor CP is discharged through the switches SW6 and SW8. Accordingly, electric charges escape from the capacitor CP to the ground line. Thus, a resetting process is executed with respect to the capacitor CP.

The switches SW5, SW6, SW7, and SW8 correspond to fifth, sixth, seventh, and eighth switches in claims, respectively. The image-signal vertical-direction output lines L21 correspond to pixel-group image-signal output lines in claims.

Tenth Embodiment

Figure 23:
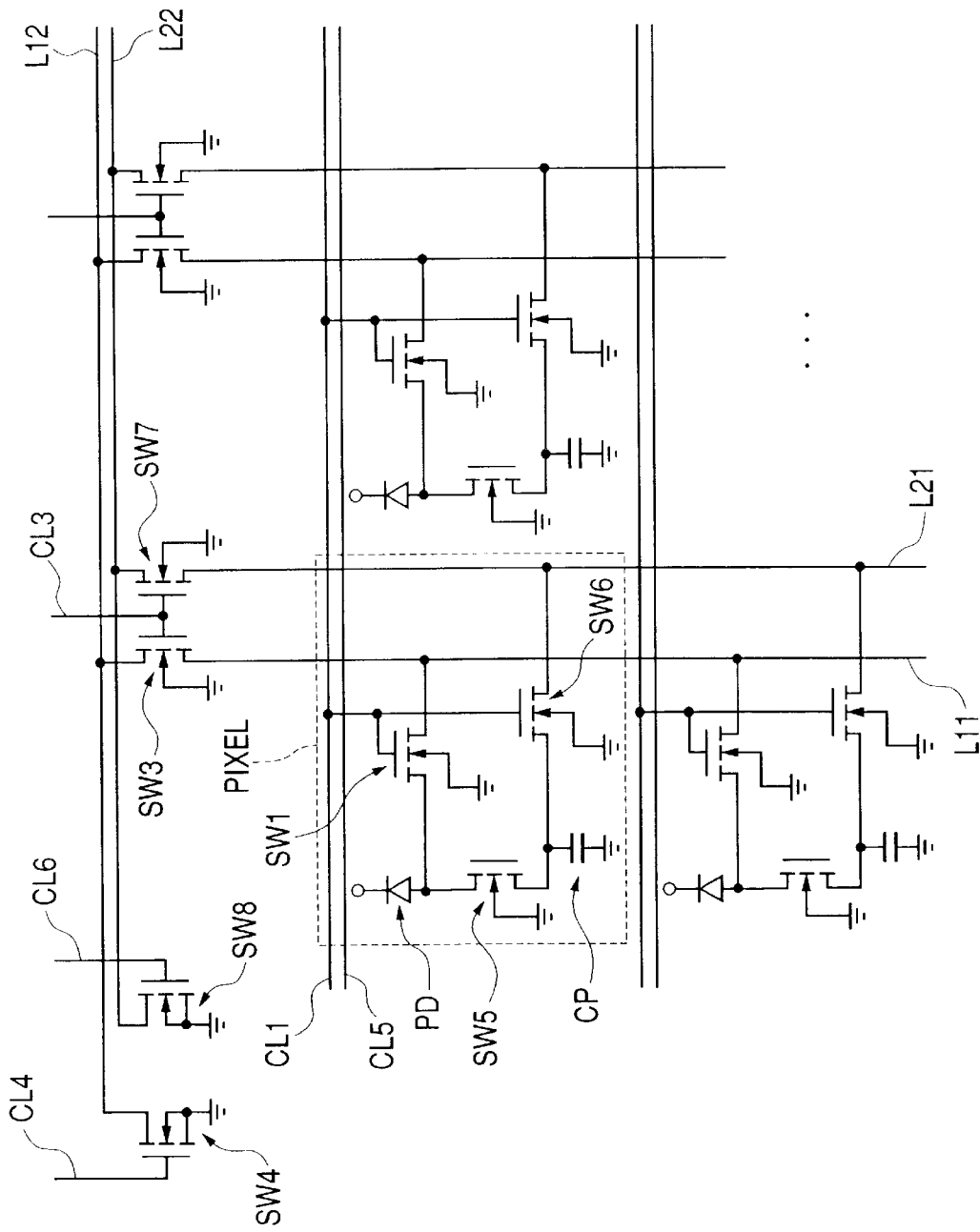
FIG. 23 is a schematic diagram of a portion of a matrix pixel array which forms a portion of a photodetector array in a tenth embodiment of this invention.

A tenth embodiment of this invention is a modification of the ninth embodiment thereof. FIG. 23 shows a portion of a matrix pixel array (a photodetector array) in the tenth embodiment of this invention.

As shown in FIG. 23, a single switch SW4 is provided between a last-stage output line L12 and a ground line. The switch SW4 is connected to a control line CL4. When the switch SW4 is in its on state, all the pixels in the matrix pixel array remain non-selected. Change of the switch SW4 to its on state causes unwanted electric charges to escape to the ground line.

As shown in FIG. 23, a single switch SW8 is provided between a last-stage image-signal output line L22 and the ground line. The switch SW8 is connected to a control line CL6. When the switch SW8 is changed to its on state, the last-stage image-signal output line L22 is connected to the ground line. Change of the switch SW8 to its on state allows the escape of unwanted electric charges to the ground line.

Eleventh Embodiment

An eleventh embodiment of this invention is a modification of one of the first to tenth embodiments thereof. In the eleventh embodiment of this invention, each switch SW1 includes a series combination of multiple sub switches. Similarly, each switch SW2 includes a series combination of multiple sub switches. Also, each switch SW4 includes a series combination of multiple sub switches.

Twelfth Embodiment

A twelfth embodiment of this invention is a modification of one of the first to eleventh embodiments thereof. The twelfth embodiment of this invention is designed to apply a forward laser pulse beam to a predetermined field of view (a predetermined detection area) without changing the direction of the travel of the beam.

What is claimed is:
1. A photo detecting device comprising:
   a processing circuit;
   an output line leading to the processing circuit;
   a ground line;

an array of pixels including respective photo detecting zones for changing incident light into corresponding electric signals through photoelectric conversion, wherein each of the pixels includes a first switch for selectively connecting and disconnecting a related photo detecting zone to and from the output line, and a second switch for selectively connecting and disconnecting the related photo detecting zone to and from the ground line;

means for causing the second switch to disconnect the related photo detecting zone from the ground line when the first switch connects the related photo detecting zone to the output line; and means for causing the second switch to connect the related photo detecting zone to the ground line when the first switch disconnects the related photo detecting zone from the output line.

2. A photo detecting device as recited in claim 1, wherein the photo detecting zone of each of the pixels comprises a pin photodiode, and the first and second switches are formed in well layers separate from the photo detecting zone.

3. A photo detecting device as recited in claim 1, further comprising a matrix arrangement of pixels provided in the array of pixels, common lines provided in the output line, wherein pixels in one of one-direction pixel groups in the matrix arrangement are connected to one of the common lines, a third switch for selectively connecting and disconnecting one of the common lines to and from the processing circuit, a fourth switch for selectively connecting and disconnecting one of the common lines to the ground line, means for causing the fourth switch to disconnect the related common line from the ground line when the third switch connects the related common line to the processing circuit, and means for causing the fourth switch to connect the related common line to the ground line when the third switch disconnects the related common line from the processing circuit.

4. A photo detecting device as recited in claim 3, further comprising first control lines each for controlling the first switches in one of row-direction pixel groups in the matrix arrangement, second control lines each for controlling the second switches in one of the row-direction pixel groups in the matrix arrangement, a third control line for controlling the third switch, and a fourth control line for controlling the fourth switch.

5. A photo detecting device as recited in claim 1, further comprising a capacitor provided in each of the pixels for storing electric charges generated by the related photo detecting zone in response to the incident light, an image-signal output line leading to the processing circuit, a fifth switch provided in each of the pixels for selectively connecting and disconnecting the photo detecting zone to and from the capacitor, a sixth switch for selectively connecting and disconnecting the capacitor to and from the image-signal output line, the second switch being for selectively connecting and disconnecting the capacitor to and from the ground line, and means for causing the second switch to connect the capacitor to the ground line during a predetermined time interval after causing the sixth switch to connect the capacitor to the image-signal output line.

6. A photo detecting device as recited in claim 5, further comprising a matrix arrangement of pixels provided in the array of pixels, common image-signal lines provided in the image-signal output line, wherein pixels in one of one-direction pixel groups in the matrix arrangement are connected to one of the common image-signal lines, and a seventh switch for selectively connecting and disconnecting one of the common image-signal lines to and from the processing circuit.

7. A photo detecting device as recited in claim 5, further comprising means for connecting the photo detecting zone and the capacitor in series in each of the pixels, and an amplifier circuit provided between the sixth switch and the image-signal output line.

8. A photo detecting device as recited in claim 5, further comprising means for connecting the photo detecting zone and the capacitor in parallel in each of the pixels, means for precharging the capacitor, means for discharging the capacitor in response to the incident light applied to the photo detecting zone, and means for causing the first switch to connect the photo detecting zone to the output line to output the electric signal to the output line, and then causing the sixth switch to connect the capacitor to the image-signal output line to output the electric charges to the image-signal output line.

9. A photo detecting device as recited in claim 5, further comprising fifth control lines each for controlling the fifth switches in one of row-direction pixel groups in the matrix arrangement, and sixth control lines each for controlling the sixth switches in one of the row-direction pixel groups in the matrix arrangement.

10. A distance measuring apparatus comprising:

light applying means for applying laser light;

a photo detecting device for detecting reflected light caused by reflection of the laser light applied by the light applying means at an object, the photo detecting device including a plurality of pixels;

changing and selecting means for changing and selecting a pixel among the pixels in the photo detecting device as an active pixel;

time difference measuring means for measuring a time difference between a moment of application of the laser light by the light applying means and a moment of detection of the reflected light by the photo detecting device; and distance calculating means for calculating a physical quantity representative of a distance to the object on the basis of the time difference measured by the time difference measuring means;

wherein the photo detecting device comprises a photo detecting device of claim 1.

11. A distance measuring apparatus as recited in claim 10, wherein the changing and selecting means comprises means for changing and selecting a pixel among the pixels in the photo detecting device as an active pixel in response to a direction of application of the laser light.

12. A distance measuring apparatus as recited in claim 10, which is mounted on a vehicle, wherein a direction of travel of the laser light corresponds to one of a vehicle width-wise direction and a vehicle height direction with respect to the vehicle.

13. A distance and image measuring apparatus comprising:

light applying means for applying laser light;

a photo detecting device for detecting reflected light caused by reflection of the laser light applied by the light applying means at an object, and for generating an image signal in response to the detected reflected light;

time difference measuring means for measuring a time difference between a moment of application of the laser light by the light applying means and a moment of detection of the reflected light by the photo detecting device;

distance calculating means for calculating a physical quantity representative of a distance to the object on the basis of the time difference measured by the time difference measuring means; and image measuring means for measuring an image on the basis of the image signal generated by the photo detecting device;

wherein the photo detecting device comprises a photo detecting device of claim 5.

14. A distance and image measuring apparatus as recited in claim 13, further comprising means for changing an intensity of the laser light applied by the light applying means in accordance with the image measured by the image measuring means.

15. The photo detecting device of claim 1, wherein the photo detecting zone of each of the pixels is comprised of a pin photodiode that includes:

a substrate of a first conductivity type:

a high resistivity region formed on the substrate of the first conductivity type; and an impurity region of a second conductivity type diffused into a surface portion of the high resistivity region.

16. The photo detecting device of claim 15, wherein the first switch is comprised of a first well layer and the second switch is comprised of a second well layer, both the first well layer and the second well layer are formed in the high resistivity region and both the first well layer and the second well layer are isolated from the pin photodiode.

17. A photo detecting device comprising:

a processing circuit;

a matrix arrangement of pixels including respective photo detecting zones for changing incident light into corresponding electric signals through photoelectric conversion;

common output lines leading to the processing circuit and each provided for pixels in one of one-direction pixel groups in the matrix arrangement;

a ground line;

a first switch provided in each of the pixels for selectively connecting and disconnecting a related photo detecting zone to and from one of the common output lines;

a third switch for selectively connecting and disconnecting one of the common output lines to and from the processing circuit;

a fourth switch for selectively connecting and disconnecting one of the common output lines to and from the ground line;

means for causing the fourth switch to disconnect the related common output line from the ground line when the first switch connects the related photo detecting zone to the common output line and the third switch connects the related common output line to the processing circuit; and means for causing the fourth switch to connect the related common output line to the ground line when the first switch disconnects the related photo detecting zone from the common output line and the third switch disconnects the related common output line from the processing circuit.

18. A photo detecting device as recited in claim 17, further comprising means for causing the first switch to connect the related photo detecting zone to the common output line and causing the third switch to connect the related common output line to the processing circuit when the fourth switch connects the related common output line to the ground line, and then causing the fourth switch to disconnect the related common output line from the ground line.

19. A photo detecting device as recited in claim 17, further comprising a capacitor provided in each of the pixels for storing electric charges generated by the related photo detecting zone in response to the incident light, an image-signal output line leading to the processing circuit, a fifth switch provided in each of the pixels for selectively connecting and disconnecting the photo detecting zone to and from the capacitor, a sixth switch for selectively connecting and disconnecting the capacitor to and from the image-signal output line, a seventh switch for selectively connecting and disconnecting the image-signal output line to and from the processing circuit, and an eighth switch for selectively connecting and disconnecting the image-signal output line to and from the ground line.

20. A photo detecting device comprising:

a processing circuit;

a matrix arrangement of pixels including respective photo detecting zones for changing incident light into corresponding electric signals through photoelectric conversion;

a last-stage output line leading to the processing circuit;

common output lines connected to the last-stage output line and each provided for pixels in one of one-direction pixel groups in the matrix arrangement;

a ground line;

a first switch provided in each of the pixels for selectively connecting and disconnecting a related photo detecting zone to and from one of the common output lines;

a third switch for selectively connecting and disconnecting one of the common output lines to and from the last-stage output line;

a fourth switch for selectively connecting and disconnecting the last-stage output line to and from the ground line;

means for causing the fourth switch to disconnect the last-stage output line from the ground line when the first switch connects the related photo detecting zone to the common output line and the third switch connects the related common output line to the last-stage output line; and means for causing the fourth switch to connect the last-stage output line to the ground line when the first switch disconnects the related photo detecting zone from the common output line and the third switch disconnects the related common output line from the last-stage output line.

* * * * *